United States Patent
Book et al.

(10) Patent No.: US 11,423,373 B1
(45) Date of Patent: *Aug. 23, 2022

(54) INTELLIGENT SUBSCRIPTION IDENTIFICATION USING TRANSACTION DATA

(71) Applicant: Block, Inc., San Francisco, CA (US)

(72) Inventors: Theodore Book, Atlanta, GA (US); Conner Bryan, Atlanta, GA (US); Christopher Costes, Brookhaven, GA (US); Donald Newell, Atlanta, GA (US); Elaine Perez, Atlanta, GA (US); Christopher Zhang, Atlanta, GA (US)

(73) Assignee: Block, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,004

(22) Filed: Sep. 17, 2019

(51) Int. Cl.
*G06Q 20/10* (2012.01)
*G06Q 30/06* (2012.01)
*G06Q 20/12* (2012.01)

(52) U.S. Cl.
CPC .......... *G06Q 20/102* (2013.01); *G06Q 20/12* (2013.01); *G06Q 30/0635* (2013.01)

(58) Field of Classification Search
USPC ............................................. 715/747; 705/40
See application file for complete search history.

(56) References Cited

U.S. PATENT DOCUMENTS

| 6,415,262 | B1* | 7/2002 | Walker | G06Q 30/0226 |
| | | | | 705/14.27 |
| 6,571,279 | B1* | 5/2003 | Herz | G06F 16/9535 |
| | | | | 709/219 |
| 7,756,756 | B1* | 7/2010 | Lifson | G06Q 30/0601 |
| | | | | 705/26.1 |
| 7,831,483 | B1* | 11/2010 | Lifson | G06Q 30/0623 |
| | | | | 705/26.7 |

(Continued)

FOREIGN PATENT DOCUMENTS

| CA | 2836877 C | 6/2020 |
| WO | 00/39723 A2 | 7/2000 |

OTHER PUBLICATIONS

Subscription-Based Product Price Optimization, An IP.com Prior Art Database Technical Disclosure Authors et al.: Disclosed Anonymously (Subscription) (Year: 2019).*

(Continued)

*Primary Examiner* — Chikaodinaka Ojiaku
(74) *Attorney, Agent, or Firm* — Lee & Hayes, P.C.

(57) ABSTRACT

Intelligent subscription identification using transaction data is described. In an example, a computing system can receive transaction data associated one or more transactions between one or more merchants and one or more customers. Based at least in part on the transaction data, the computing system can determine that a first customer of the one or more customers purchased a first item at a first time and that a second customer of the one or more customers purchased a second item at a second time. The computing system can (Continued)

determine a recommendation to offer a subscription to enable the one or more customers to access a third item at a third time, send the recommendation to a device operable by a merchant of the one or more merchants, and associate an indication of the subscription with a profile of the merchant.

20 Claims, 16 Drawing Sheets

(56) References Cited

U.S. PATENT DOCUMENTS

| | | | | |
|---|---|---|---|---|
| 9,021,363 | B2* | 4/2015 | Blake, III | G06F 9/453 |
| | | | | 715/741 |
| 9,817,916 | B2* | 11/2017 | Flack | H04L 67/28 |
| 9,858,356 | B1* | 1/2018 | Johnson | G06Q 30/0631 |
| 10,026,062 | B1* | 7/2018 | Sasmaz | G07G 5/00 |
| 10,073,923 | B2* | 9/2018 | Koren | G06F 3/0484 |
| 10,139,998 | B2* | 11/2018 | Glasgow | G06F 40/186 |
| 10,185,703 | B2* | 1/2019 | Abrahami | G06F 40/103 |
| 10,402,064 | B1* | 9/2019 | Al-Sallami | G06F 40/186 |
| 10,586,266 | B2* | 3/2020 | Fredrich | G06Q 30/0631 |
| 10,650,435 | B2* | 5/2020 | Kumar | G06Q 30/0633 |
| 10,719,860 | B2* | 7/2020 | Bifolco | G06Q 30/0601 |
| 10,769,708 | B2* | 9/2020 | Alvo | G06Q 30/0202 |
| 10,866,708 | B2* | 12/2020 | Al-Sallami | G06F 40/103 |
| 2003/0200139 | A1* | 10/2003 | Yan | G06Q 30/0239 |
| | | | | 705/14.36 |
| 2003/0208754 | A1* | 11/2003 | Sridhar | H04N 21/25883 |
| | | | | 348/E7.071 |
| 2004/0078300 | A1* | 4/2004 | Smith | G06Q 30/02 |
| | | | | 705/26.1 |
| 2005/0214729 | A1* | 9/2005 | Greenly | G06Q 10/10 |
| | | | | 434/307 R |
| 2005/0261973 | A1 | 11/2005 | Van Luchene | |
| 2007/0157317 | A1* | 7/2007 | Venkatachalam | G06Q 30/06 |
| | | | | 726/27 |
| 2007/0235465 | A1* | 10/2007 | Walker | G07F 9/002 |
| | | | | 221/9 |
| 2008/0103903 | A1* | 5/2008 | Flake | G06Q 30/0277 |
| | | | | 705/37 |
| 2009/0043907 | A1* | 2/2009 | Peterson | G06F 3/0236 |
| | | | | 715/810 |
| 2009/0254971 | A1* | 10/2009 | Herz | G06Q 10/10 |
| | | | | 726/1 |
| 2010/0049603 | A1* | 2/2010 | Peterson | G06Q 30/0264 |
| | | | | 705/14.45 |
| 2010/0076818 | A1* | 3/2010 | Peterson | G06Q 30/02 |
| | | | | 705/14.44 |
| 2011/0035295 | A1* | 2/2011 | Lifson | G06Q 30/0633 |
| | | | | 705/26.61 |
| 2012/0029982 | A1* | 2/2012 | Andrade | G06Q 30/0236 |
| | | | | 705/14.1 |
| 2012/0323674 | A1* | 12/2012 | Simmons | G06Q 30/0241 |
| | | | | 705/14.41 |
| 2013/0110639 | A1* | 5/2013 | So | G06Q 30/02 |
| | | | | 705/14.66 |
| 2013/0218664 | A1* | 8/2013 | Carlson | G06Q 30/0244 |
| | | | | 705/14.43 |
| 2014/0046777 | A1* | 2/2014 | Markey | G06Q 30/0275 |
| | | | | 705/14.66 |
| 2014/0129426 | A1* | 5/2014 | Lamb | G06Q 20/342 |
| | | | | 705/39 |
| 2014/0207518 | A1* | 7/2014 | Kannan | G06F 16/958 |
| | | | | 705/7.29 |
| 2014/0297425 | A1* | 10/2014 | Kim | G06Q 50/01 |
| | | | | 705/14.66 |
| 2014/0302825 | A1* | 10/2014 | Mogalapalli | H04W 4/14 |
| | | | | 455/414.1 |
| 2014/0378091 | A1* | 12/2014 | Irwin | H04M 15/49 |
| | | | | 455/405 |
| 2015/0170210 | A1* | 6/2015 | Rhee | H04M 3/4878 |
| | | | | 705/14.64 |
| 2015/0294384 | A1* | 10/2015 | So | G06Q 30/0611 |
| | | | | 705/26.4 |
| 2015/0324884 | A1* | 11/2015 | Ouimet | G06Q 30/0207 |
| | | | | 705/14.27 |
| 2016/0063511 | A1* | 3/2016 | Ben-Eliezer | G06Q 30/0631 |
| | | | | 705/7.29 |
| 2016/0180380 | A1* | 6/2016 | Sharp | G06Q 30/0264 |
| | | | | 705/14.53 |
| 2016/0189156 | A1* | 6/2016 | Kim | G06Q 20/4012 |
| | | | | 705/72 |
| 2016/0225046 | A1* | 8/2016 | Chang | G06Q 30/0605 |
| 2016/0253651 | A1* | 9/2016 | Park | G06Q 20/322 |
| | | | | 705/39 |
| 2017/0024827 | A1* | 1/2017 | McGill | G06Q 40/08 |
| 2017/0046738 | A1* | 2/2017 | Cameron | A24F 40/65 |
| 2017/0124630 | A1* | 5/2017 | Shin | G06Q 30/0633 |
| 2017/0262913 | A1* | 9/2017 | So | G06F 16/9554 |
| 2017/0293901 | A1* | 10/2017 | Savla | G06Q 20/102 |
| 2017/0300897 | A1* | 10/2017 | Ferenczi | G06Q 20/3821 |
| 2018/0181484 | A1* | 6/2018 | Jambu | H04L 67/20 |
| 2018/0204256 | A1* | 7/2018 | Bifolco | G06Q 30/0623 |
| 2018/0247368 | A1* | 8/2018 | Shuster | G06Q 30/0633 |
| 2019/0019203 | A1* | 1/2019 | Jang | G06F 16/9535 |
| 2020/0090246 | A1* | 3/2020 | Goyal | G06K 9/6223 |
| 2020/0169480 | A1* | 5/2020 | Shimokawa | H04L 41/5051 |
| 2020/0183553 | A1* | 6/2020 | Al-Sallami | G06Q 30/0641 |
| 2020/0183554 | A1* | 6/2020 | Al-Sallami | G07G 1/01 |
| 2020/0183555 | A1* | 6/2020 | Al-Sallami | G06F 3/0484 |
| 2020/0202377 | A1* | 6/2020 | Yacoub | G06Q 30/0223 |
| 2020/0202379 | A1* | 6/2020 | Yacoub | G06Q 30/0222 |
| 2020/0311802 | A1* | 10/2020 | Brosnan | G06Q 30/0639 |
| 2020/0320607 | A1* | 10/2020 | Beauchamp | G06Q 30/0641 |

OTHER PUBLICATIONS

K. G. Javkar, S. H. Vora, A. S. Rodge, J. Bose and H. Sharma, "Best offer recommendation service," 2016 International Conference on Advances in Computing, Communications and Informatics (ICACCI), Jaipur, India, 2016, pp. 2430-2436, (Best Offer) (Year: 2016).*
K. H. Lee, D. Shen, A. Lippman, D. Reed and H. D. Schumacher, "Connected Consumption: The Hidden Networks of Consumption," 2009 6th IEEE Consumer Communications and Networking Conference, 2009, pp. 1-5, (Connected Consumption) (Year: 2009).*
W. Song, Framkom, Weidong Kou and C. J. Tan, "An investigation on multiple e-payments and micro-payment—a technical and market view," Proceedings 16th International Parallel and Distributed Processing Symposium, 2002, pp. 8 pp-, doi: 10.1109/IPDPS.2002. 1016625. (Micro Payments) (Year: 2002).*
Non-Final Office Action dated Feb. 2, 2021, for U.S. Appl. No. 16/573,995, of Book, T. et al., filed Sep. 17, 2019.
Final Office Action dated Jun. 21, 2021, for U.S. Appl. No. 16/573,995, of Book, T. et al., filed Sep. 17, 2019.
Non-Final Office Action dated Oct. 29, 2021, for U.S. Appl. No. 16/573,995, of Book, T. et al., filed Sep. 17, 2019.
Advisory Action dated Aug. 30, 2021, for U.S. Appl. No. 16/573,995, of Book, T. et al., filed Sep. 17, 2019.

* cited by examiner

INTELLIGENT SUBSCRIPTION IDENTIFICATION USING TRANSACTION DATA

TECHNICAL FIELD

A subscription is an arrangement for providing, receiving, or making use of something of a continuing or periodic nature. Rather than selling items (e.g., goods or services) individually, many merchants offer customers subscriptions where customers pay a recurring price at regular intervals for access to a good or a service. Subscriptions enable merchants predictable and constant revenue streams (e.g., during a term of a subscription). Further, subscriptions can increase brand loyalty. For customers, subscriptions offer conveniences such as discounts and/or repeated fulfillment which can save time.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
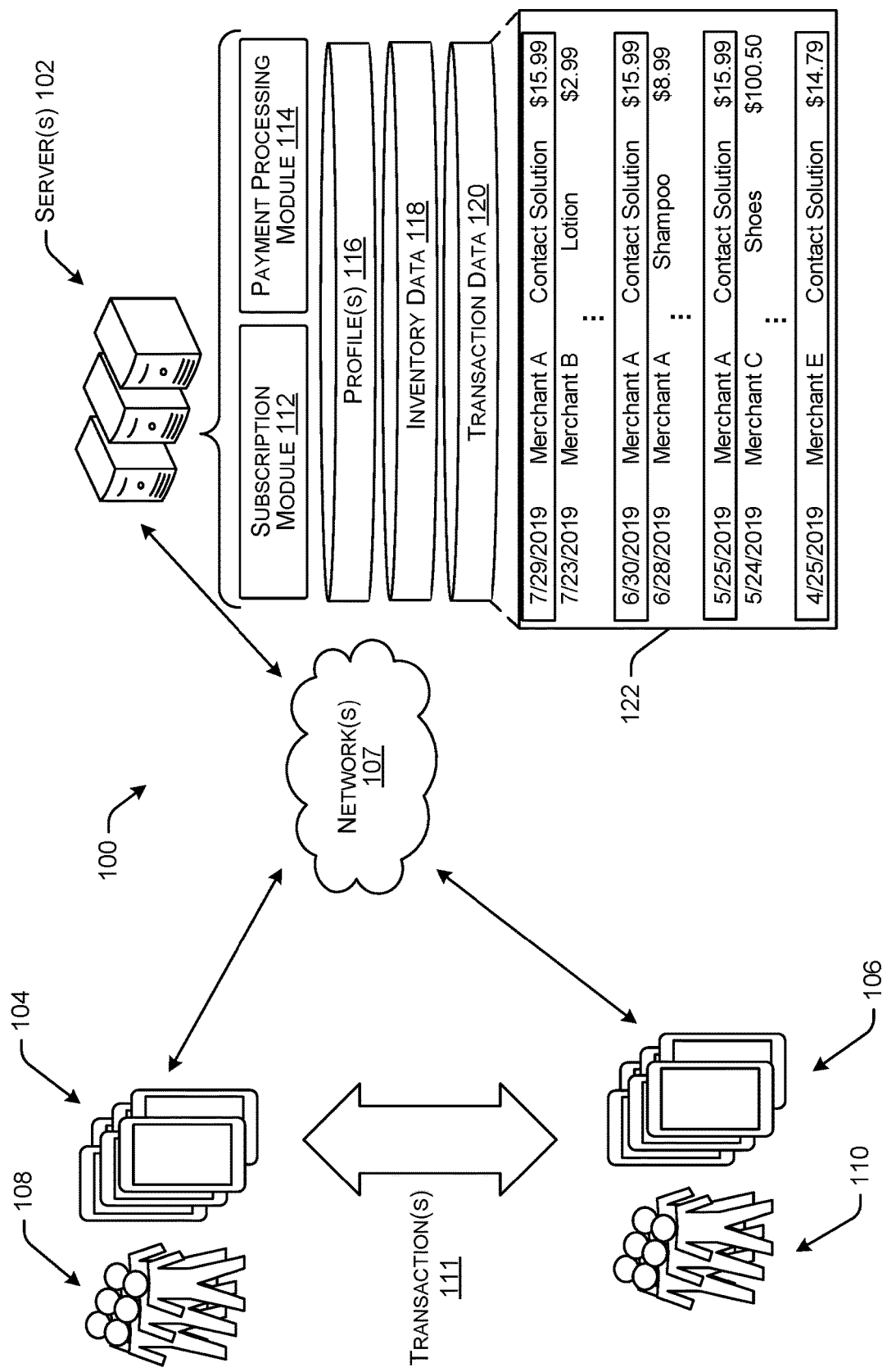
FIG. 1 illustrates an example environment for intelligently identifying a subscription opportunity for a customer based at least in part on transaction data as described herein.

Techniques described herein are directed to intelligently identifying opportunities for subscriptions for merchants and/or customers using transaction data associated with past transactions. In an example, transaction data associated with past transactions between merchants and customers can be analyzed to determine when an item (e.g., instances thereof) is purchased at a substantially regular interval (e.g., repeatedly). Based on determining that the item is purchased at a substantially regular interval, a subscription opportunity can be identified for a customer and/or a merchant. That is, techniques described herein can use itemized purchase history(s) of customer(s) to dynamically generate and/or offer subscriptions on the fly (e.g., based on what customers are purchasing). If a subscription is created for the customer, the customer can receive the additional items periodically (e.g., at intervals) without having to take subsequent action to purchase such items. That is, such items can be delivered (or otherwise provided) to the customer periodically (at a time after the subscription is established) based on the subscription. Additionally or alternatively, if a subscription is created for the merchant, the merchant can offer items to customers via a subscription. As such, the merchant can send (or otherwise provide) items to customers that subscribe to such items periodically (at a time after the subscription is established) without the customers needing to take subsequent action to purchase such items.

In an example, a customer can purchase instances of an item (and/or items of the same item type) from one or more merchants one time per month. For example, the customer can purchase laundry detergent, which may or may not be associated with a same brand, from one or more merchants approximately every 28-30 days. Such a buying pattern can be observed from transaction data indicative of the customer's past transactions. Based on determining that the customer purchases laundry detergent every 28-30 days, a service provider can identify a subscription opportunity for the customer. In at least one example, the service provider can send an offer to the customer to prompt the customer to subscribe to receiving laundry detergent such that the service provider and/or a merchant can deliver (or otherwise provide) the laundry detergent to the customer periodically without the customer having to take any other action (e.g., go to a brick-and-mortar store to shop for the laundry detergent and/or order the laundry detergent online via an ecommerce channel). The frequency at which the customer receives the laundry detergent can be based on the substantially regular interval observed from the transaction data (e.g., 28-30 days) and/or can be specified by the customer or the merchant. In some examples, the service provider can bill the customer for the subscription in a lump sum (a single payment paid at some frequency less than the frequency at which the laundry detergent is delivered (or otherwise provided) to the customer) or in association with each installment of the subscription (e.g., each time the laundry detergent is delivered (or otherwise provided) to the customer).

As another example, a customer can purchase coffee from a coffee shop each morning. Such a buying pattern can be observed from transaction data indicative of the customer's past transactions. Based on determining that the customer purchases coffee every morning from the same coffee shop, a service provider can identify a subscription opportunity for the customer. In at least one example, the service provider can send an offer to the customer to prompt the customer to subscribe to coffee from the coffee shop. In an example, the coffee shop can prepare the coffee each morning (e.g., at or near a same time) so that the customer can pick up the coffee without having to order it that morning. In some examples, the customer can receive a prompt requesting the customer to confirm or cancel an order for a particular day prior to the coffee shop preparing the coffee for that day. In some examples, the service provider can bill the customer for the subscription in a lump sum (a single payment paid at some frequency less than the frequency at which the coffee is picked up by the customer) or in association with each installment of the subscription (e.g., each time the coffee is picked up by the customer).

In an additional or alternative example, transaction data can indicate that one or more customers purchase instances of an item (and/or items associated with a same item type) every 45-50 days. For example, one or more customers can purchase dish soap every 45-50 days. The dish soap may or may not be associated with the same brand and may or may not be purchased from the same merchant. Based on determining that one or more customers purchase dish soap every 45-50 days, the service provider can prompt one or more merchants to create a subscription for dish soap such that customers can opt to subscribe to receiving dish soap periodically without having to take any other action. The frequency at which the customers receive the laundry detergent can be based on the a substantially regular interval observed from the transaction data (e.g., 45-50 days) and/or can be specified by the merchant or individual customers. That is, the service provider can prompt the one or more merchants to establish a subscription and an indication of such can be associated with an item (e.g., as presented via a graphical user interface (GUI) associated with an online store and/or as presented in association with the item at a brick-and-mortar location). For customers who subscribe to receiving dish soap, the merchant can cause dish soap to be delivered (or otherwise provided) to the customers periodically, as described above.

As described above, a subscription is an arrangement for providing, receiving, or making use of something of a continuing or periodic nature. Rather than selling items (e.g., goods or services) individually, many merchants offer customers subscriptions where customers pay a recurring price at regular intervals for access to a good or a service. However, in conventional technologies, merchants opt to offer only certain items via a subscription model, e.g., based on item availability or knowledge that items are consumable (and thus require replacement). Many conventional technologies require merchants to create a subscription plan. That is, conventional technologies are inefficient and cause friction for merchants. Many items that are ripe for subscriptions are overlooked and merchants don't take the time to create subscription plans because of the time and resources required.

Conventional technologies do not have access to transaction data as described herein. That is, conventional technologies do not utilize a network-based merchant environment to generate and/or access transaction data for multiple, different merchants (and customers) for determining buying patterns across multiple, different merchants (and customers). Such buying patterns can be used to intelligently identify subscription opportunities for merchants and/or customers, even for items that are otherwise not identified by a traditional subscription model. That is, techniques described herein can leverage transaction data—that can include item-level granularity—associated with multiple, different merchants (and/or customers) to generate customized and/or personalized subscription opportunities as opposed to the one-size-fits-all subscriptions that are availed via conventional technologies. For instance, techniques described herein can identify subscription opportunities that enable customers to receive items at a frequency particular to their buying habits (or other customers similar to the customers) and/or enable merchants to provide items at a frequency that is observed from buying habits of their customers and/or customers of other or similar merchants. In some implementations, creating customer-specific subscription flows can simplify network complexities and improve network efficiencies by replacing one-off/irregular purchase behavior with predictable purchase behavior.

Techniques described herein offer various benefits to entities associated with the network-based merchant environment. For instance, by providing a recommendation to a merchant based on customer purchase behavior, the merchant is more likely to convert a customer into a repeat customer or even a subscriber. As such, the merchant can receive an incremental increase in revenue based on ensuring that a customer purchases an item repeatedly as opposed to running the risk of the customer forgetting to make their regular purchase. Furthermore, more subscriptions enable recurring revenue and increased cash flow for merchants. Moreover, techniques described herein enable merchants to dynamically offer subscriptions on the fly based on what their customers are purchasing, thereby reducing the friction of generating and/or managing subscriptions. For customers, techniques described herein reduce friction associated with regular purchases and, in some examples, enable customers to subscribe to items or services through subscriptions that are customized and/or personalized for them. Additional benefits and efficiencies are described throughout this disclosure.

FIG. 1 illustrates an example environment 100 for intelligently identifying a subscription opportunity for a customer based at least in part on transaction data. In FIG. 1, server(s) 102 can be associated with a service provider, that can provide one or more services, as described below with reference to FIG. 15. In at least one example, the server(s) 102 can communicate with user computing devices, such as merchant device(s) 104 and customer device(s) 106, via network(s) 107. That is, the merchant device(s) 104 and the customer device(s) 106 are network-connected devices that enable end users (e.g., merchant(s) 108 and customer(s) 110, respectively) to access services provided by the service provider (e.g., via the server(s) 102). In some examples, the service provider can be a merchant of the merchant(s) 108 or a customer of the customer(s) 110. Additional details associated with the server(s) 102, the user computing devices (e.g., 104, 106), and the network(s) 107 are described below with reference to FIGS. 15 and 16.

In at least one example, the merchant(s) 108 and the customer(s) 110 can participate in transaction(s) 111, whereby a merchant provides an item (e.g., a good or service) to a customer via a brick-and-mortar store, a mobile store (e.g., pop-up shop, food truck, etc.), online store, combinations of the foregoing, and so forth. In some examples, a customer can purchase an item from a merchant for some consideration (e.g., the cost of the item). In other examples, a customer can acquire an item from a merchant via other means including, but not limited to, renting an item, borrowing an item, receiving an item for free, etc. In at least one example, individual transaction(s) 111 can be associated with transaction data, which can indicate item(s) acquired via a transaction, descriptions of item(s) associated with the transaction, a cost of the individual item(s), a total cost of the transaction, payment data for satisfying the total cost of the transaction, an identity of a customer, an identity of a merchant, a date, time, and/or location associated with the transaction, and so on. Payment data, as described herein, may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc.

The server(s) 102 can be associated with one or more functional components, which can include a subscription module 112 and a payment processing module 114. The subscription module 112 can analyze transaction data to identify subscription opportunities for merchant(s) 108 and/or customer(s) 110 and/or can manage subscriptions. The payment processing module 114 can process payment for the transaction(s) 111 between merchant(s) 108 and/or customer(s) 110. Additional details associated with the subscription module 112 and the payment processing module 114 are described below.

Additionally, the server(s) 102 can be associated with one or more data stores storing data including, but not limited to, profile(s) 116, inventory data 118, and transaction data 120.

In at least one example, the profile(s) 116 can store user profiles, which can include merchant profiles, customer profiles, and so on.

Merchant profiles can store, or otherwise be associated with, data associated with merchants, such as the merchant(s) 108. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant (e.g., associated with a linked bank account). Further, the merchant profile can store payment information associated with a payment instrument linked to an account maintained by the service provider.

Customer profiles can store, or otherwise be associated with, data associated with customers, such as the customer(s) 110. Such customer data can include, but is not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

The inventory data 118 can store data items associated with items that a merchant has available for sale (or other form of acquisition). Inventory data 118 can additionally include information associated with each item, such as item characteristics (e.g., size, color, volume, dimensions, scent, brand, etc.), quantity of an item, price of an item, whether a subscription is available for the item, a subscription price, etc. In at least one example, at least a portion of the inventory data 118 can be mapped to, or otherwise associated with, individual merchant profiles. That is, inventory data 118 of a particular merchant can be mapped to, or otherwise associated with, the profile of the particular merchant.

The transaction data 120 can be associated with transactions processed by the service provider (e.g., the payment processing module 114) on behalf of the merchant(s) 108. In at least one example, a data item associated with a transaction can indicate item(s) acquired via a transaction, descriptions of item(s) associated with the transaction, a cost of the individual item(s), a total cost of the transaction, payment data for satisfying the total cost of the transaction, an identity of a customer, an identity of a merchant, a date, time, and/or location associated with the transaction, and so on. In some examples, the transaction data 120 can be associated with transactions that are not processed by the service provider. In such an example, the transaction data can be accessed via a third-party source or system, for instance, via an application programming interface (API) or a software developer kit (SDK) that enables functionality described herein to be integrated into third-party sources or systems. As described above, the transaction data 120 can be associated with brick-and-mortar transactions, ecommerce (e.g., online) transactions, combinations of the foregoing, and the like.

In at least one example, the subscription module 112 can analyze transaction data 120 and can determine that a customer makes repeat purchases of an item and/or items of an item type at a substantially regular interval. For the purpose of this discussion, a customer can make "repeat purchases of an item" or "purchase an item repeatedly" such that the customer purchases additional instances of a same item (e.g., Brand A toothpaste, Brand B coffee beans, etc.) more than one time. For the purpose of this discussion, "item type" is used to describe a class of items, wherein items in the class are substantially similar (e.g., a similarity metric associated with such items, determined, for example using a machine-trained data model(s), meets or exceeds a threshold). For example, laundry detergent associated with different brands, having different volumes (e.g., fluid ounces), different scents, different cleaning capabilities, etc. may not be the same "item" per se, but may be associated with the same "item type" (i.e., laundry detergent). In some examples, a machine-trained data model can output a similarity score or other metric indicative of a similarity between two items. Such a similarity score can be used to classify items as a same item type.

In at least one example, the subscription module 112 can determine that an item (e.g., instances thereof) and/or items of the same item type are purchased by a customer at a substantially regular interval based at least in part on determining, from the transaction data 120, that the customer purchases the item (e.g., instances thereof) and/or the items of the same item type (i) at a particular frequency and/or (ii) after the lapse of subsequent periods of time, wherein the subsequent periods of time differ by less than a threshold. In at least one example, the subscription module 112 can determine, based on the transaction data 120, that a customer purchases a first item at a first time, a second item at a second time, and a third item at a third time. The first item, the second item, and the third item can be instances of a same item (or item type). In at least one example, the first time, the second time, and the third time can be associated with a frequency indicative that the customer purchases instances of an item (or item type) at a substantially regular interval. For example, the subscription module 112 can determine that a customer purchases an item (e.g., instances thereof) and/or items of the same item type at a particular rate (e.g., one time per day, one time per month, one time per certain number of days, one time per week, etc.). In an additional or alternative example, a first period of time between the first time and the second time, and a second period of time between the second time and the third time can be substantially equal. In some examples, the intervals between purchases can be equal. However, in some examples, the intervals between purchases may not be equal. For intervals to be "substantially regular," a difference between individual intervals may be less than a threshold such that the variation between the length of the intervals is minimal. As an example, the subscription module 112 can determine that the customer purchases an item (e.g., instances thereof) and/or items of the same item type in a recurring fashion (e.g., occurring periodically or repeatedly) after the lapse of some period of time (e.g., every 24 hours, every 45 days, every 90 days, etc.).

In at least one example, the subscription module 112 can utilize machine-trained data models to determine that an item (e.g., instances thereof) and/or items of the same item type are purchased by a customer at a substantially regular interval and/or to otherwise identify a pattern indicative of a recurring purchase. In additional or alternative examples, the subscription module 112 can utilize statistical models, heuristics, or other mechanisms for determining that an item (e.g., instances thereof) and/or items of the same item type are purchased by a customer at a substantially regular interval and/or to otherwise identify a pattern indicative of a recurring purchase.

While the preceding discussion relates to determining that a customer purchases items in a pattern indicating that a customer is a candidate for a subscription, in some examples, additional or alternative factors can be considered to determine whether the customer is a candidate for a subscription. For instance, in an example, quantity (e.g., bulk vs. small size), cost (e.g., using coupons, discounts, or selecting a less expensive purchasing option), or the like can be indicative that a customer is a candidate for a subscription. That is, in addition to the frequency with which a customer purchases a same item and/or items of a same item type, the subscription module 112 can additionally or alternatively consider quantity, cost, etc. in determining that a customer qualifies for a subscription.

In at least one example, based on determining that a customer purchases an item (e.g., instances thereof) and/or items of the same item type at a substantially regular interval, the subscription module 112 can determine that the customer qualifies for a subscription. In at least one example, the subscription module 112 can present an offer to the customer to prompt the customer to set up a subscription. Such a subscription can enable the customer to access additional items periodically without subsequently requesting such items. That is, the customer need not return to a brick-and-mortar store or online store to purchase another instance of an item associated with a subscription. In some examples, the subscription module 112 can present such an offer via a point-of-sale (POS) device of a merchant in association with a transaction being processed at the POS device. In an additional or alternative example, the subscription module 112 can present such an offer via a device of a customer (e.g., a customer device), for example in association with an ecommerce transaction and/or at some other time. In some examples, the offer can be presented via a graphical user interface (GUI) that is associated with an actuation mechanism that, when actuated, causes the subscription to be set up via a single interaction with the GUI (e.g., a one-click subscription). In at least one example, the offer can be associated with an incentive (e.g., a discount, free shipping, etc.) to incentivize the customer to sign up for a subscription. Responsive to a customer indicating a desire to establish a subscription, the subscription module 112 can associate an indication of the subscription with a profile of the customer. Such an indication can cause the profile of the customer to be associated with a subscription that is associated with an "active" subscription status.

In some examples, based at least in part on the subscription being established, the subscription module 112 can fulfill the subscription via one or more fulfillment events, which can correspond to "installments." In at least one example, the customer can specify a preferred fulfillment method (e.g., pick-up (e.g., from a particular merchant and/or merchant(s) the customer frequents), ship to home, delivery, etc.) when the subscription is created and/or at a later time. In examples where an address is required (e.g., ship to home, delivery, etc.), the subscription module 112 can use the customer's address, if it is associated with a profile of the profile(s) 116, or the subscription module 112 can prompt the customer for their address prior to the first fulfillment event. In some examples, the merchant can specify one or more fulfillment methods. In at least one example, the interval of time between fulfillment events can be based, at least in part, on the "substantially regular interval" observed from previous transactions. In alternative examples, the interval of time between fulfillment events can be specified by the customer and/or the merchant. That is, the frequency at which the items are provided to the customer can be informed based on patterns observed from the transaction data 120 and/or can be specified by the customer and/or the merchant. In some examples, a subscription can be associated with consistent fulfillment events (e.g., items fulfilled at regular intervals). In other examples, a subscription can be associated with variable fulfillment events. In such examples, an item and/or item type can be fulfilled in a recurring pattern but may not be provided at regular intervals.

In at least one example, prior to a fulfillment event, the subscription module 112 can generate an order for an item associated with the subscription. The subscription module 112 can reserve an item in an inventory of a merchant based at least in part on generating the order. The order can be associated with a total cost. The subscription module 112, via the payment processing module 114, can determine that the cost of the order is satisfied (e.g., via the processing of a payment in association with the fulfillment event or via a previous payment associated with the subscription), and the subscription module 112 can process the order. That is the subscription module 112 can cause the item to be delivered (or otherwise provided) to the customer.

In at least one example, a customer can establish a subscription with an individual merchant. In such an example, an indication of the subscription can be associated with a profile of the merchant and the subscription module 112 can fulfill the subscription using inventory of the merchant. In other examples, a customer can establish a subscription with the service provider, and the subscription module 112 can fulfill the subscription using inventory of one or more merchants associated with the service provider. That is, the service provider can be agnostic to which merchant it uses to fulfill an installment of a subscription (e.g., so long as the merchant can satisfy conditions of the subscription such as item type, fulfillment date, fulfillment method, etc.). In some examples, the subscription module 112 can access and analyze prices from different merchants and can purchase an item from a merchant associated with the lowest advertised price. In some examples, such a savings can be passed on to the customer. In other examples, the service provider can collect the difference between the cost of the installment advertised to the customer and the cost of the item as purchased from the merchant associated with the lowest advertised price. In some examples, where the subscription module 112 cannot find an item for a price lower than what is advertised to the customer as the cost of the installment, the service provider can pay the difference between the cost of the installment advertised to the customer and the cost of the item as purchased from the merchant.

In at least one example, a customer can pay for the items associated with the subscription via a lump sum payment (a single payment paid at some frequency less than the frequency at which items are delivered (or otherwise provided) to the customer) or in association with each installment of the subscription (e.g., each time an item is delivered (or otherwise provided) to the customer). Fees associated with subscriptions and/or installments associated therewith can be flat fees, custom fees, tiered fees, unit-based, etc. In some examples, the fees can be set by the service provider. In at least one example, the customer can set a range that the customer is willing to pay for a subscription and the subscription module 112 can identify a subscription associated with a price within the provided range. In at least one example, if a customer is billed in association with an installment, the customer can be billed prior to an installment being fulfilled or after an installment is fulfilled. In some examples, a customer may be billed prior to an installment being fulfilled, for example, if an item is associated with a fixed fee and usage associated with such an installment is not likely to vary. Further, a customer may be billed after an installment is fulfilled if, for example, the cost of the subscription varies based on usage. In at least one example, payment from a customer may be delayed until after a trial period (e.g., a free trial period).

In some examples, a customer can have previously agreed to store payment data on file with the service provider (e.g., in a profile of the profile(s) 116) and such payment data can be used, by the payment processing module 114, to process payment for the items associated with the subscription. In additional or alternative examples, a customer can provide payment data for satisfying the cost of the items associated with the subscription at the time the subscription is created or in association with an installment of the subscription. In such examples, the payment data can be stored (e.g., by the service provider) for subsequent use, by the payment processing module 114, to process payment paying for subsequent installments of the subscription.

In at least one example, the payment data can be associated with a linked bank account. In an additional or alternative example, the payment data can be associated with an account that is maintained by the service provider (e.g., generated from payment processing performed by the service provider, from peer-to-peer payments facilitated by the service provider, etc.). In some examples, funds associated with the account can be used, by the payment processing module 114, to process payment for the cost of the items associated with the subscription at the time the subscription is created and/or in association with each installment. In an example where funds associated with the account are insufficient to satisfy the cost of a subscription and/or an installment associated therewith, the payment processing module 114 can access funds associated with a linked bank account of the merchant and/or otherwise prompt the customer to provide an alternative form of payment.

In some examples, the subscription module 112 can create a subscription without input from the customer. For instance, based at least in part on determining that a customer purchases an item (e.g., instances thereof) and/or items of the same item type repeatedly at a substantially regular interval, the subscription module 112 can associate an indication of a subscription with a profile of the customer and can send the customer an item after a lapse of a period of time based, at least in part, on the substantially regular interval. That is, the subscription module 112 can automatically cause the profile of the customer to be associated with an "active" subscription status for the subscription. In some examples, the first installment can be offered to the customer for no charge (e.g., the service provider pays a cost associated with the installment, the merchant provides the item at no cost, etc.) and the customer can be charged for subsequent installments. If the customer does not want to create a subscription for the item, the customer can cancel the subscription, and, in some examples, the service provider can refund and/or credit the customer for the cost of the item (if the customer was charged for the first installment). If the customer cancels the subscription, the subscription module 112 can disassociate an indication of the subscription from the profile of the customer and/or the subscription can be associated with an "inactive" subscription status. In some examples, if a subscription is associated with a pre-paid service that has an end date (e.g., the last day of the month, etc.), the subscription module 112 can refrain from dissociating the indication of the subscription from the profile of the customer and/or associating an "inactive" subscription status with the subscription until the end date. That is, the subscription can remain active until the end date.

As an example, in FIG. 1, a portion 122 of the transaction data 120 indicates a subset of transactions associated with a customer. As illustrated, the customer purchases contact solution at a substantially regular interval, as highlighted by the transactions identified with boxes in FIG. 1. Per the portion 122 of the transaction data 120, the customer appears to purchase contact solution every 28-30 days. As such, the subscription module 112 can create a subscription for the contact solution for the customer. In some examples, the subscription can be created without input from the customer. In other examples, the subscription can be created responsive to an indication that the customer desires to establish a subscription. In at least one example, responsive to establishing the subscription, the subscription module 112 can send a subscription confirmation to the customer (e.g., a device associated therewith) and, in some examples, associate an indication of the subscription with a profile of the customer. Furthermore, in at least one example, the subscription module 112 can reserve inventory for fulfillment of one or more installments of the subscription. Additional details are provided below.

Figure 2:
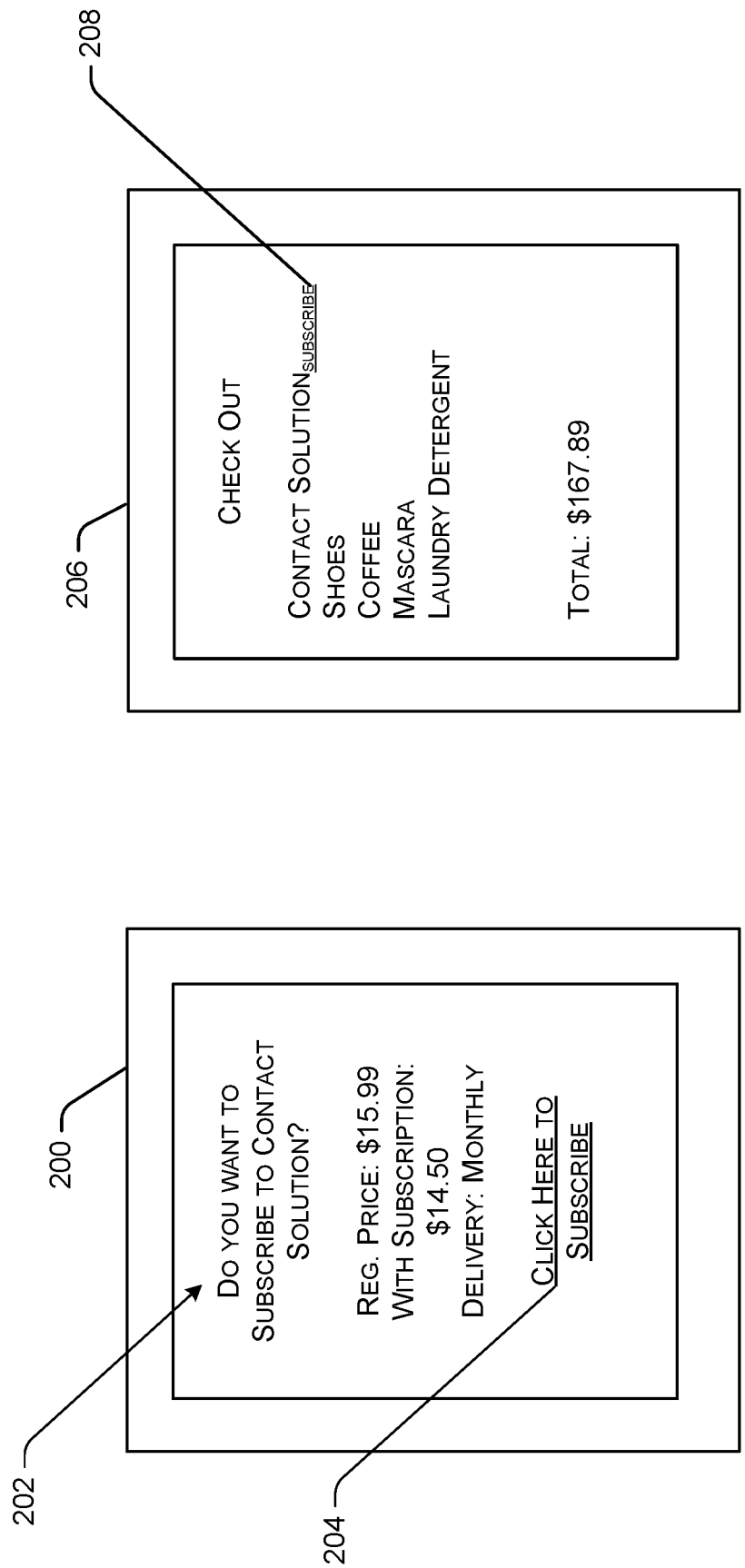
FIG. 2A illustrates an example graphical user interface (GUI) for presenting an offer for a subscription to a user as described herein.
FIG. 2B illustrates another example GUI for presenting an offer for a subscription to a user as described herein.

FIG. 2A illustrates an example GUI 200 for presenting an offer for a subscription to a user as described herein. For instance, in at least one example, the subscription module 112 can cause the GUI 200 to be presented via a display of a device operable by a user. In some examples, such a GUI 200 can be presented via one of the merchant device(s) 104. In additional or alternative examples, such a GUI 200 can be presented via one of the customer device(s) 106.

In at least one example, the subscription module 112 can cause an offer for a subscription to be associated with a virtual cart or other GUI presented in association with a checkout flow of a transaction. The items being promoted for subscription may be in the customer's current cart, customer's past carts or transaction history, or even carts of similar customers. For instance, the GUI 200 can be presented while a customer is checking out either at a brick-and-mortar POS or an ecommerce POS. In at least one example, the subscription module 112 can receive an identifier associated with a customer associated with a virtual cart or a transaction being processed at a POS. For example, a customer can "log-in" to an account associated with an ecommerce POS or a customer can provide a loyalty number at a brick-and-mortar POS. In at least one example, payment data can serve as an identifier of a customer, which can be provided to satisfy a cost of a transaction. In such examples, the device receiving such an identifier (e.g., a customer device or a merchant device) can transmit the identifier to the subscription module 112 and the subscription module 112 can access a portion of transaction data 120 associated with the customer, which can be used for determining whether to offer the customer a subscription at the POS. In some examples, such a determination can be made in near real-time. However, in other examples, the profile of the customer can be associated with an indication regarding a subscription opportunity (e.g., that has been previously identified).

In additional or alternative examples, the subscription module 112 can cause an offer for a subscription to be presented at any other time (e.g., prior to, during, or after a transaction). In some examples, if a subscription is presented to a customer after a transaction, the subscription module 112 can refund and/or credit the customer at least a portion of a previous purchase price for an item associated with the subscription. That is, in at least one example, the subscription module 112 can generate a subscription and retroactively provide benefits of the subscription to the customer.

In at least one example, the GUI 200 can include text element(s) 202 that include an offer for a subscription and identifies the item(s) associated with the subscription. As illustrated in FIG. 2A, the offer is associated with a subscription for contact solution. The text element(s) 202 can include a price associated with the item with and without the subscription, a frequency at which an installment of the subscription occurs, an interval between installments, a quantity of items associated with an installment, etc. In at least one example, at least some of the information (e.g., quantity, frequency of installments, interval between installments, etc.) associated with the subscription can be auto-populated based on customer buying patterns identified from the portion 122 of the transaction data 120. In some examples, the offer can be associated with an incentive (e.g., in FIG. 2A, a discount), which can be included in the text element(s) 202.

In at least one example, the GUI 200 can include an actuation mechanism 204 that, when actuated, can send an indication from the device presenting the GUI 200 to the server(s) 102. In at least one example, responsive to receiving such an indication, the subscription module 112 can associate an indication of the subscription with a profile of the customer (e.g., in the profile(s) 116). That is, the profile of the customer can be associated with a subscription that is associated with an "active" subscription status (e.g., for the item).

In an additional or alternative example, the subscription module 112 can cause additional information to be presented via the GUI 200 prior to associating the indication of the subscription with the profile of the customer. For instance, the subscription module 112 can prompt the customer to input a fulfillment method (e.g., pick-up (e.g., from a particular merchant and/or merchant(s) the customer frequents), ship to home, delivery, etc.), an address (if necessary and/or not already stored in association with a profile of the customer), payment data (if not already stored in association with a profile of the customer), input and/or confirmation of quantity, frequency of installments, interval between installments, etc. Responsive to providing necessary information, the subscription module 112 can send a subscription confirmation to the customer (e.g., a device associated therewith) and, in some examples, can reserve inventory for fulfillment of one or more installments of the subscription.

In some examples, the GUI 200 can be presented via a user interface on a device operable by a user, such as one of the merchant device(s) 104 and/or the customer device(s) 106. In at least one example, such a user interface can be presented via a web browser, or the like. In other examples, such a user interface can be presented via an application, such as a mobile application or desktop application, which can be provided by the service provider, or which can be an otherwise dedicated application. In some examples, the GUI 200 can be presented as a push notification, an email, a text message, or the like. In other examples, the customer can request the offer to be sent to their device from the POS. These offers may be associated with an expiration date to encourage the customers to accept subscriptions within a certain time period.

FIG. 2B illustrates an example GUI 206 for presenting an offer for a subscription to a user as described herein. In at least one example, the subscription module 112 can cause an offer for a subscription to be associated with a virtual cart or other GUI presented in association with a checkout flow of a transaction. For instance, the GUI 206 can be presented while a customer is checking out either at a brick-and-mortar POS or an ecommerce POS. As illustrated in FIG. 2B, the GUI 206 can include an actuation mechanism 208 that, when actuated, can send an indication from the device presenting the GUI 200 to the server(s) 102. In at least one example, responsive to receiving such an indication, the subscription module 112 can associate an indication of the subscription with a profile of the customer (e.g., in the profile(s) 116). That is, the profile of the customer can be associated with a subscription that is associated with an "active" subscription status (e.g., for the item).

As described above, in some examples, the subscription module 112 can cause additional information to be presented via the GUI 206 (e.g., price of item(s) associated with the subscription, fulfillment frequency, etc.) prior to associating the subscription with the profile of the customer. Moreover, in an additional or alternative example, the subscription module 112 can prompt the customer to input a fulfillment method (e.g., pick-up (e.g., from a particular merchant and/or merchant(s) the customer frequents), ship to home, delivery, etc.), an address (if necessary and/or not already stored in association with a profile of the customer), payment data (if not already stored in association with a profile of the customer), input and/or confirmation of quantity, frequency of installments, interval between installments, etc. Responsive to providing necessary information, the subscription module 112 can send a subscription confirmation to the customer (e.g., a device associated therewith) and, in some examples, can reserve inventory for fulfillment of one or more installments of the subscription.

The GUIs 200 and 206 are provided as example GUIs and should not be construed as limiting. GUIs can include additional or alternative information, can be presented via additional or alternative configurations, and/or can be output via additional or alternative output mechanisms.

While FIGS. 1, 2A, and 2B describe examples where a single item is identified for a subscription, in some examples, the subscription module 112 can identify two or more items for a subscription. That is, in some examples, the subscription module 112 can analyze the transaction data 120 and can determine that one or more customers purchase two or more items (e.g., and/or items of corresponding item types) at a substantially regular interval, and often together. In such an example, the subscription module 112 can offer a subscription for the two or more items, which can be bundled together to provide discounts and/or shared fulfillment (e.g., can be picked-up together, delivered together, etc.). In some examples, bundled subscriptions (e.g., subscriptions associated with two or more items) can be fulfilled by a single merchant or two or more merchants. Furthermore, in some examples, bundled subscriptions can be fulfilled via different fulfillment options, and/or by different combination of merchants each time, e.g., based on availability, timing, cost restrictions, etc.

Figure 3:
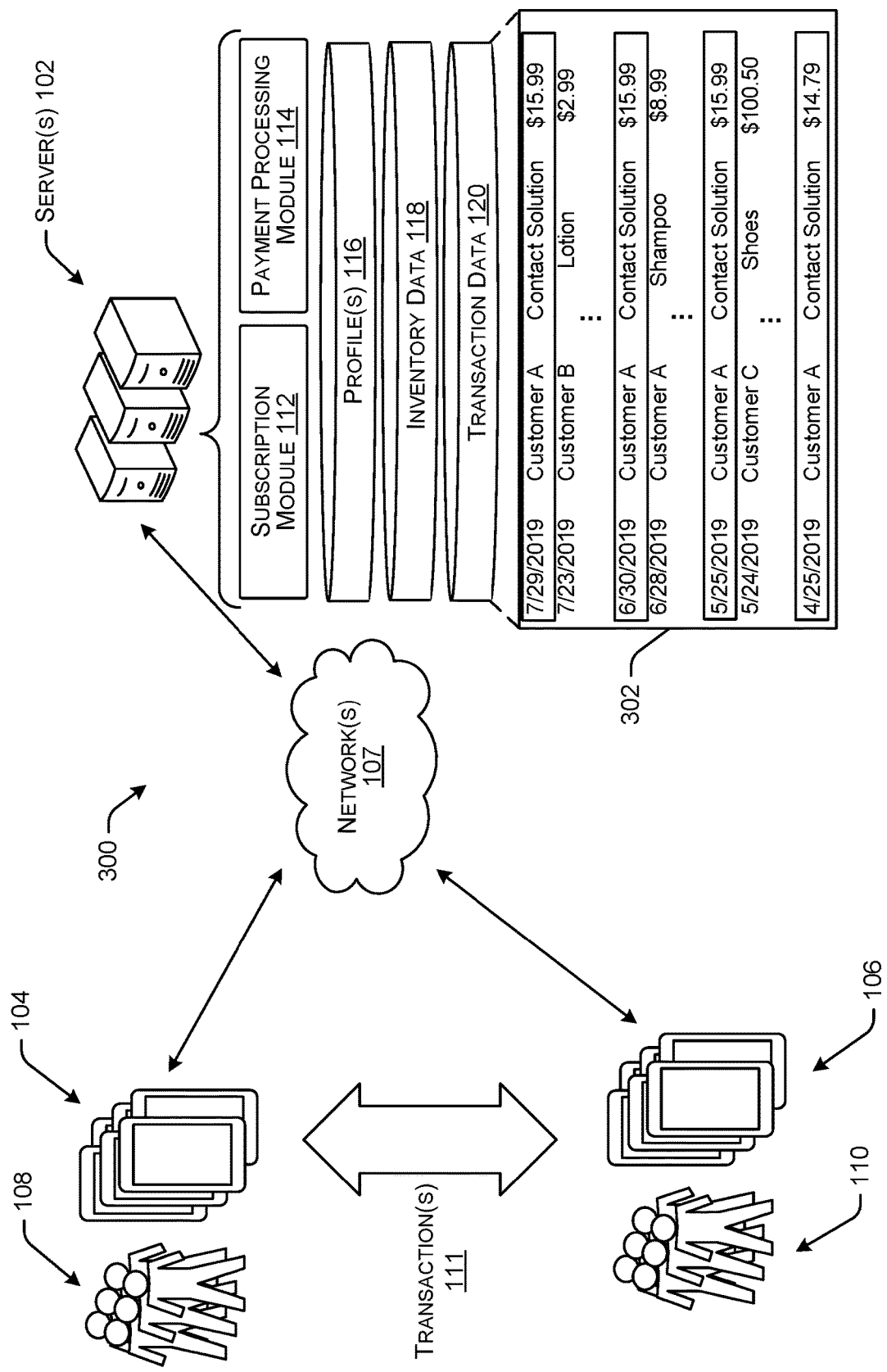
FIG. 3 illustrates an example environment for intelligently identifying a subscription opportunity for a merchant based at least in part on transaction data as described herein.

FIG. 3 illustrates an example environment 300 for intelligently identifying a subscription opportunity for a merchant based at least in part on transaction data. The environment 300 includes the same or similar devices and/or users as described above with reference to FIG. 1. FIG. 3, however, depicts a different portion 302 of the transaction data 120 which is associated with a merchant of the merchant(s) 108. As illustrated in FIG. 3, an individual customer is shown as purchasing contact solution from the merchant at a substantially regular interval (e.g., every 28-30 days). In at least one example, the subscription module 112 can generate a recommendation to send to a merchant device of the merchant device(s) 104 to recommend that the merchant set up or otherwise offer a subscription for contact solution.

That is, in at least one example, the subscription module 112 can analyze transaction data 120 and can determine that one or more customers purchase an item (e.g., instances thereof) and/or items of the same item type at a substantially regular interval. In at least one example, the subscription module 112 can determine that an item (e.g., instances thereof) and/or items of the same item type are purchased by one or more customers at a substantially regular interval based at least in part on determining, from the transaction data 120, that the one or more customers purchase the item (e.g., instances thereof) and/or the items of the same item type (i) at a particular frequency and/or (ii) after the lapse of subsequent periods of time, wherein the subsequent periods of time differ by less than a threshold. In at least one example, the subscription module 112 can determine, based on the transaction data 120, that one or more customers purchase a first item at a first time, a second item at a second time, and a third item at a third time. The first item, the second item, and the third item can be instances of a same item (or item type). In at least one example, the first time, the second time, and the third time can be associated with a frequency indicative that the customer(s) purchase instances of an item (or item type) at a substantially regular interval. For example, the subscription module 112 can determine that one or more customers purchase an item (e.g., instances thereof) and/or items of the same item type at a particular rate (e.g., one time per day, one time per month, one time per certain number of days, one time per week, etc.). In an additional or alternative example, a first period of time between the first time and the second time, and a second period of time between the second time and the third time can be substantially equal. In some examples, the intervals between purchases can be equal. However, in some examples, the intervals between purchases may not be equal. For intervals to be "substantially regular," a difference between individual intervals may be less than a threshold such that the variation between the length of the intervals is minimal. As an example, the subscription module 112 can determine that one or more customers purchase an item (e.g., instances thereof) and/or the items of the same item type in a recurring fashion (e.g., occurring periodically or repeatedly) after the lapse of some period of time (e.g., every 24 hours, every 45 days, every 90 days, etc.).

In at least one example, the subscription module 112 can utilize machine-trained data models to determine that an item (e.g., instances thereof) and/or items of the same item type are purchased by one or more customers at a substantially regular interval and/or to otherwise identify a pattern indicative of a recurring purchase. In additional or alternative examples, the subscription module 112 can utilize statistical models, heuristics, or other mechanisms for determining that an item (e.g., instances thereof) and/or items of the same item type are purchased by one or more customers at a substantially regular interval and/or to otherwise identify a pattern indicative of a recurring purchase.

While FIG. 3 illustrates a single customer (e.g., Customer A), techniques described herein can utilize aggregated transaction data 120 associated with multiple, different merchants and multiple, different customers. In some examples, one or more customers can purchase the item (e.g., instances thereof) and/or the items of the same item type at a substantially regular interval from the same merchant of the merchant(s) 108 or different merchants of the merchant(s) 108.

In at least one example, based on determining that one or more customers purchase an item (e.g., instances thereof) and/or items of the same item type at a substantially regular interval, the subscription module 112 can generate a recommendation to recommend that a merchant set up or otherwise offer a subscription. In some examples, the subscription module 112 can present such a recommendation via a POS device of a merchant in association with a transaction being processed at the POS device. In an additional or alternative example, the subscription module 112 can present such a recommendation via a device of a merchant (e.g., a merchant device) at some other time. In some examples, the offer can be presented via a GUI associated with an actuation mechanism that, when actuated, causes the subscription to be set up via a single interaction with the GUI (e.g., a one-click subscription).

In at least one example, the recommendation can be associated with an incentive (e.g., a discount, discounted service, supplementary service, etc.) to incentivize the merchant to create a subscription for the item. Furthermore, in some examples, the recommendation can be associated with a recommended price for the item (e.g., per installment, for a group of installments, etc.), a recommended frequency for fulfilling installments of the subscription, a recommended interval between installments, a recommended quantity of items associated with each installment, etc. Responsive to a merchant indicating a desire to create a subscription, the subscription module 112 can associate an indication of the subscription with a profile of the merchant (e.g., in the profile(s) 116). In at least one example, an indication of the subscription can be associated with an item in an inventory of the merchant, which is associated with the profile of the merchant.

In some examples, the subscription module 112 can create a subscription without input from the merchant. For instance, based at least in part on determining that one or more customers purchase an item and/or item(s) of a same item type at a substantially regular interval, the subscription module 112 can associate an indication of a subscription with a profile of the merchant. That is, the subscription module 112 can automatically associate an indication of the subscription with a data item corresponding to the item in the inventory data 118 (e.g., which can be associated with the profile of the merchant) and the indication of the subscription can be associated with an "active" subscription status. If the merchant does not want to create a subscription for the item, the merchant can cancel the subscription. If the merchant cancels the subscription, the subscription module 112 can disassociate the subscription from the profile of the merchant and/or the subscription can be associated with an "inactive" subscription status.

In at least one example, the payment processing module 114 can process payments for items fulfilled via a subscription, as described above. In some examples, revenue generated from payment for items associated with subscriptions can be deposited into an account of the merchant which is maintained by the service provider. In at least one example, such an account can be funded by revenue generated by transactions processed by the payment processing module 114 on behalf of the merchant.

Figure 4B:
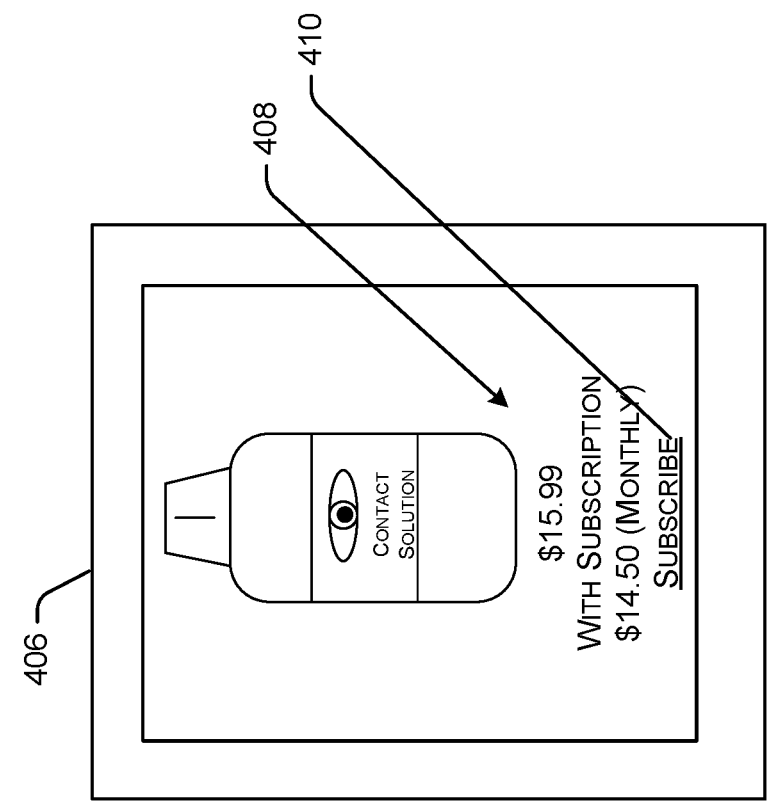
FIG. 4B illustrates an example GUI for presenting an indication that an item is associated with a subscription as described herein.
Figure 4A:
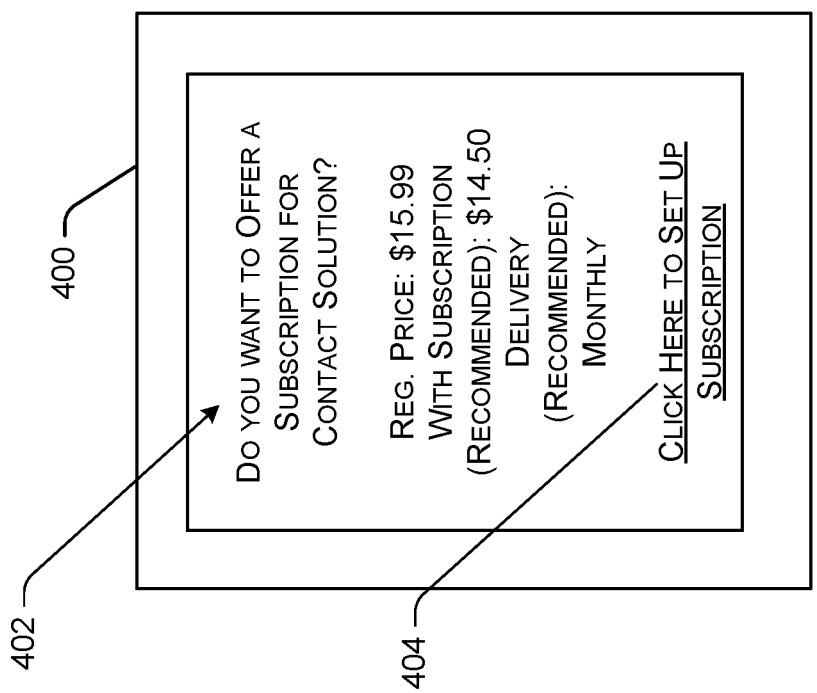
FIG. 4A illustrates an example GUI for presenting a recommendation to create a subscription to a user as described herein.

FIG. 4A illustrates an example GUI 400 for presenting a recommendation to create a subscription to a user as described herein. For instance, in at least one example, the subscription module 112 can cause the GUI 400 to be presented via a display of a device operable by a merchant (e.g., one of the merchant device(s) 104). In at least one example, the GUI 400 can include text element(s) 402 that include a recommendation for a subscription and identifies the item(s) associated with the subscription. As illustrated in FIG. 4A, the recommendation is associated with a subscription for contact solution. The text element(s) 402 can include a price associated with the item with and without the subscription, a frequency at which an installment of the subscription occurs, an interval between installments, a quantity associated with each installment, etc. In at least one example, one or more of the price, the frequency, the interval, the quantity, etc. can be recommended based at least in part on customer buying patterns observed from the transaction data 120. In some examples, the recommendation can be associated with an incentive for the merchant, which can be included in the text element(s) 402.

In at least one example, the GUI 400 can include an actuation mechanism 404 that, when actuated, can send an indication from the device presenting the GUI 400 to the server(s) 102. In at least one example, responsive to receiving such an indication, the subscription module 112 can generate a subscription and associate an indication of the subscription with a profile of the merchant. In an additional or alternative example, the subscription module 112 can cause additional information to be presented via the GUI 400 prior to generating the subscription. For instance, the subscription module 112 can prompt the merchant to provide details associated with the subscription (e.g., pricing, frequency, fulfillment options, etc.).

In some examples, the GUI 400 can be presented via a user interface on a device operable by a merchant, such as one of the merchant device(s) 104. In at least one example, such a user interface can be presented via a web browser, or the like. In other examples, such a user interface can be presented via an application, such as a mobile application or desktop application, which can be provided by the service provider, or which can be an otherwise dedicated application. In some examples, the GUI 400 can be presented as a push notification, an email, a text message, or the like.

FIG. 4B illustrates an example GUI 406 for presenting an indication that an item is associated with a subscription as described here. In at least one example, if a merchant opts to set up or otherwise offer a subscription for an item, an indication of the subscription can be presented in association with the item, for example, via a GUI 406 associated with an online store of the merchant. The GUI 406 includes text element(s) 408 that are associated with item information, including a cost of the item without a subscription or with a subscription, a frequency associated with fulfillment, etc. Further, the GUI 406 can include an actuation mechanism 410 that, when actuated, can enable a customer to subscribe to receiving the item (e.g., contact solution). In some examples, the GUI 406 (or a portion thereof) can be presented at a brick-and-mortar POS, for example, when a customer is purchasing the item from the merchant (e.g., in association with a checkout flow of a transaction). In additional or alternative examples, the GUI 406 can be presented via an online store or other ecommerce channel.

The GUIs 400 and 406 are provided as example GUIs and should not be construed as limiting. GUIs can include additional or alternative information, can be presented via additional or alternative configurations, and/or can be output via additional or alternative output mechanisms.

While FIGS. 3, 4A, and 4B describe examples where a single item is identified for a subscription, in some examples, the subscription module 112 can identify two or more items for a subscription. That is, in some examples, the subscription module 112 can analyze the transaction data 120 and can determine that one or more customers purchase two or more items (e.g., and/or items of corresponding item types) at a substantially regular interval, and often together. In such an example, the subscription module 112 can recommend that a merchant offer a subscription for the two or more items, which can be bundled together to provide discounts and/or shared fulfillment (e.g., can be picked-up together, delivered together, etc.). In some examples, bundled subscriptions (e.g., subscriptions associated with two or more items) can be fulfilled by a single merchant or two or more merchants. Furthermore, in some examples, bundled subscriptions can be fulfilled via different fulfillment options.

Figure 5:
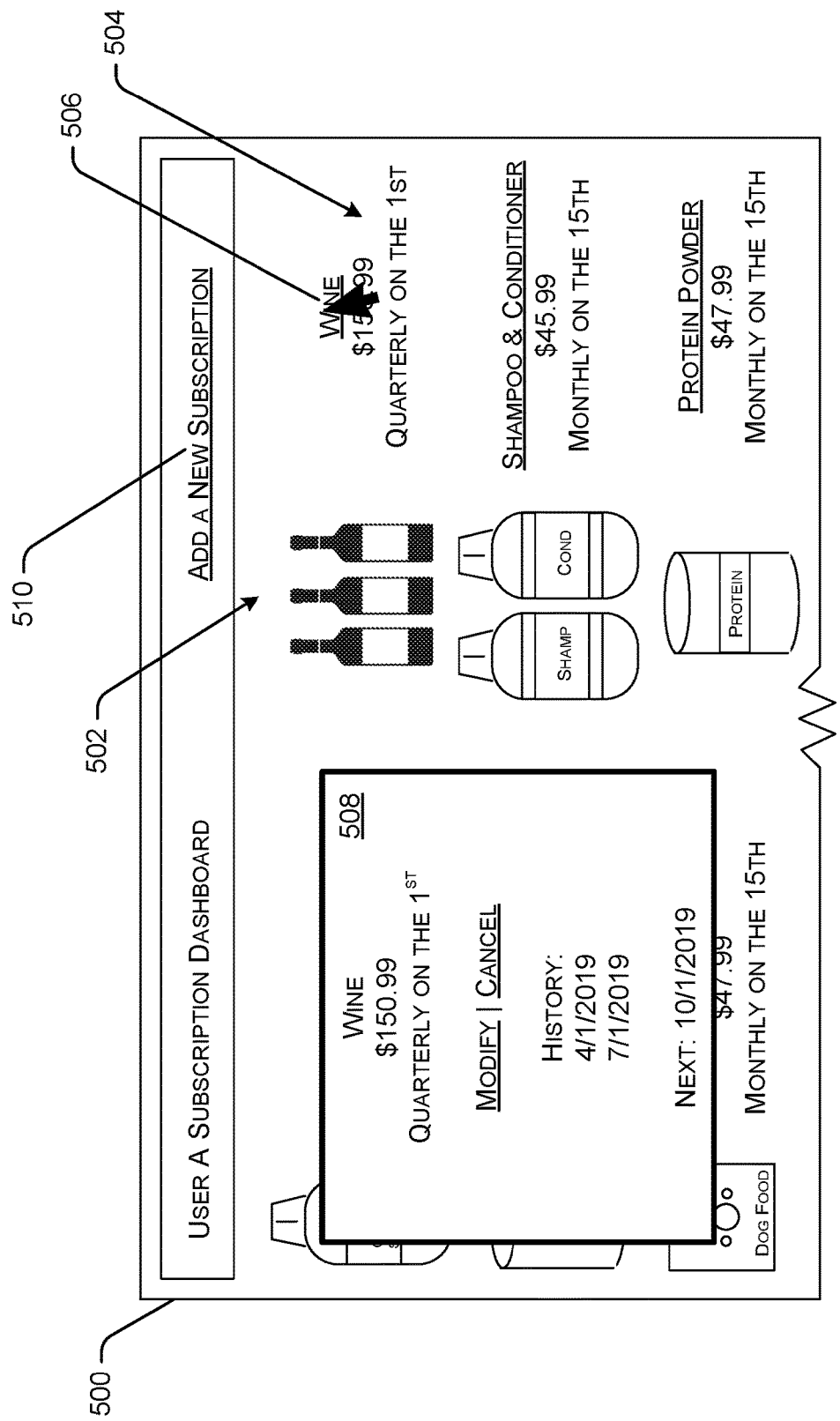
FIG. 5 illustrates an example GUI for enabling users to manage subscription(s) as described herein.

FIG. 5 illustrates an example GUI 500 for enabling users to manage subscription(s) as described herein. In at least one example, customers can subscribe to one or more subscriptions, which can be associated with one or more merchants. In at least one example, the subscription module 112 can generate and/or cause to be presented a GUI 500 that enables customers to manage their subscriptions. In such an example, individual subscriptions associated with the customer can be presented via the GUI 500. In some examples, all subscriptions associated with a customer profile, whether "active" or "inactive" can be presented via the GUI 500. In other examples, "active" subscriptions associated with the customer profile can be presented via the GUI 500 and "inactive" subscriptions may not be presented via the GUI 500. In at least one example, the subscriptions presented via the GUI 500 can be associated with merchants that are associated with the service provider (e.g., subscribe or otherwise use services of the service provider). In additional or alternative examples, the subscriptions presented via the GUI 500 can be associated with merchants that are not associated with the service provider. In such examples, such subscriptions can be added to the GUI 500 by the subscription module 112 based at least in part on information received via an API and/or SDK, or input by the customer.

In some examples, individual subscriptions can be associated with graphical element(s) 502 (e.g., which can be an image, video, drawing, etc.) and text element(s) 504 that provide information associated with the subscription. In at least one example, each subscription can be associated with an actuation mechanism, such as actuation mechanism 506, which in FIG. 5 is illustrated as a link associated with the item of each subscription (e.g., "Wine"), that when actuated enables a customer to view additional details associated with the subscription, modify details(s) of the subscription (e.g., frequency of installments, interval between installments, quantity, etc.), cancel the subscription, etc. In at least one example, responsive to a customer actuating the actuation mechanism 506, a pop-up 508 can be presented that includes additional details associated with the subscription and enables the customer to modify and/or cancel the subscription. While shown as a pop-up 508, in additional or alternative examples, such information can be presented via another GUI or another means of presentation.

In at least one example, the GUI 500 can enable a customer to add a new subscription, for instance by browsing subscriptions that are available from merchants associated with the service provider and/or merchants that are not associated with the service provider. In such an example, the customer can actuate an actuation mechanism 510 to request to browse additional subscriptions. In some examples, when customers sign up for multiple subscriptions such customers can receive discounts or other rewards and/or benefits.

In some examples, the GUI 500 can enable a customer to move subscriptions between merchants. In at least one example, a customer may be moving from a first location to a second location and the second location may not have a merchant associated with a subscription of a customer. In such an example, the subscription module 112 can identify alternative merchants that are similar to the merchant to recommend to the customer and can facilitate moving the subscription from the merchant to another merchant associated with the second location. Additionally or alternatively, a customer may choose to move a subscription to a different merchant due to the customer deciding to bundle multiple subscriptions with a single merchant, changed preferences, etc. In both examples, the customer can interact with the pop-up 508 to modify the subscription.

Furthermore, in some examples, a customer can interact with the GUI 500 to create a bundled subscription of two or more items. For example, in some examples, the customer can select multiple subscriptions and request to combine them or the customer can interact with the GUI 500 to add item(s) to an existing subscription. In some examples, bundled subscriptions (e.g., subscriptions associated with two or more items) can be fulfilled by a single merchant or two or more merchants. Furthermore, in some examples, bundled subscriptions can be fulfilled via different fulfillment options.

Figure 6:
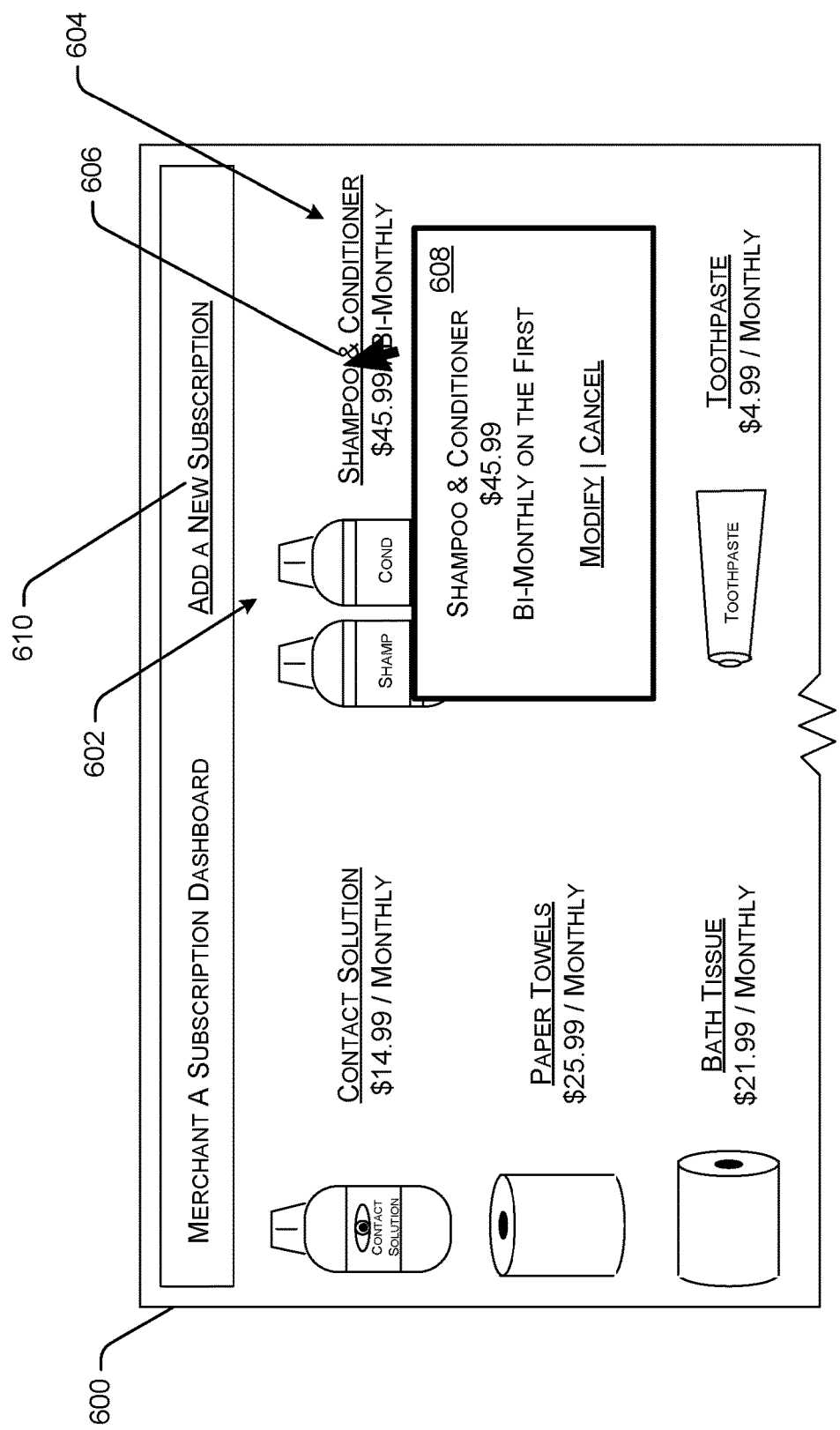
FIG. 6 illustrates an example GUI for enabling users to manage subscription(s) as described herein.

FIG. 6 illustrates an example GUI 600 for enabling users to manage subscription(s) as described herein.

In at least one example, merchants can offer one or more subscriptions for customers. In at least one example, the subscription module 112 can generate and/or cause to be presented a GUI 600 that enables merchants to manage their subscriptions. In such an example, individual subscriptions associated with a merchant (e.g., Merchant A) can be presented via the GUI 600. In some examples, all subscriptions associated with items of inventory of a merchant, whether "active" or "inactive" can be presented via the GUI 600. In other examples, "active" subscriptions can be presented via the GUI 600 and "inactive" subscriptions may not be presented via the GUI 600.

In some examples, individual subscriptions can be associated with graphical element(s) 602 (e.g., which can be an image, video, drawing, etc.) and text element(s) 604 that provide information associated with the subscription. In at least one example, each subscription can be associated with an actuation mechanism, such as the actuation mechanism 606, which in FIG. 6 is illustrated as a link associated with the item of each subscription (e.g., "Shampoo & Conditioner"), that when actuated enables a merchant to view additional details associated with the subscription, modify aspect(s) of the subscription (e.g., frequency of installments, interval between installments, price, quantity, etc.), cancel the subscription, etc. In at least one example, responsive to a merchant actuating the actuation mechanism 606, a pop-up 608 can be presented that includes additional details associated with the subscription and enables the customer to modify and/or cancel the subscription. While shown as a pop-up 608, in additional or alternative examples, such information can be presented via another GUI or another means of presentation.

In at least one example, the GUI 600 can enable a merchant to generate a new subscription. In some examples, the merchant can actuate an actuation mechanism 610 and manually input data associated with a new subscription. In other examples, the merchant can actuate an actuation mechanism 610 to browse subscriptions that are recommended by the subscription module 112.

The GUIs 500 and 600 are provided as example GUIs and should not be construed as limiting. GUIs can include additional or alternative information, can be presented via additional or alternative configurations, and/or can be output via additional or alternative output mechanisms.

While FIGS. 1-6 are described with reference to subscriptions to items, and depict goods, techniques described herein can be application to subscriptions for services as well. For example, the service provider can provide services (as described below) to users and such users can subscribe to such services via techniques described herein. For example, the service provider can offer payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In such an example, merchants can subscribe to such services via techniques described herein. Further, merchants and/or customers can offer and/or subscribe to subscriptions for additional or alternative services provided by other merchants and/or users (e.g., house cleaning, hair services, spa services, car washes, etc.).

FIGS. 7-14 are flowcharts showing example methods involving techniques as described herein. The methods illustrated in FIGS. 7-14 are described with reference to FIGS. 1-6, 15, and 16 for convenience and ease of understanding. However, the methods illustrated in FIGS. 7-14 are not limited to being performed using components described in FIGS. 1-6, 15, and 16, and such components are not limited to performing the methods illustrated in FIGS. 7-14.

The methods 700-1400 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 700-1400 can be combined in whole or in part with each other or with other methods.

Figure 7:
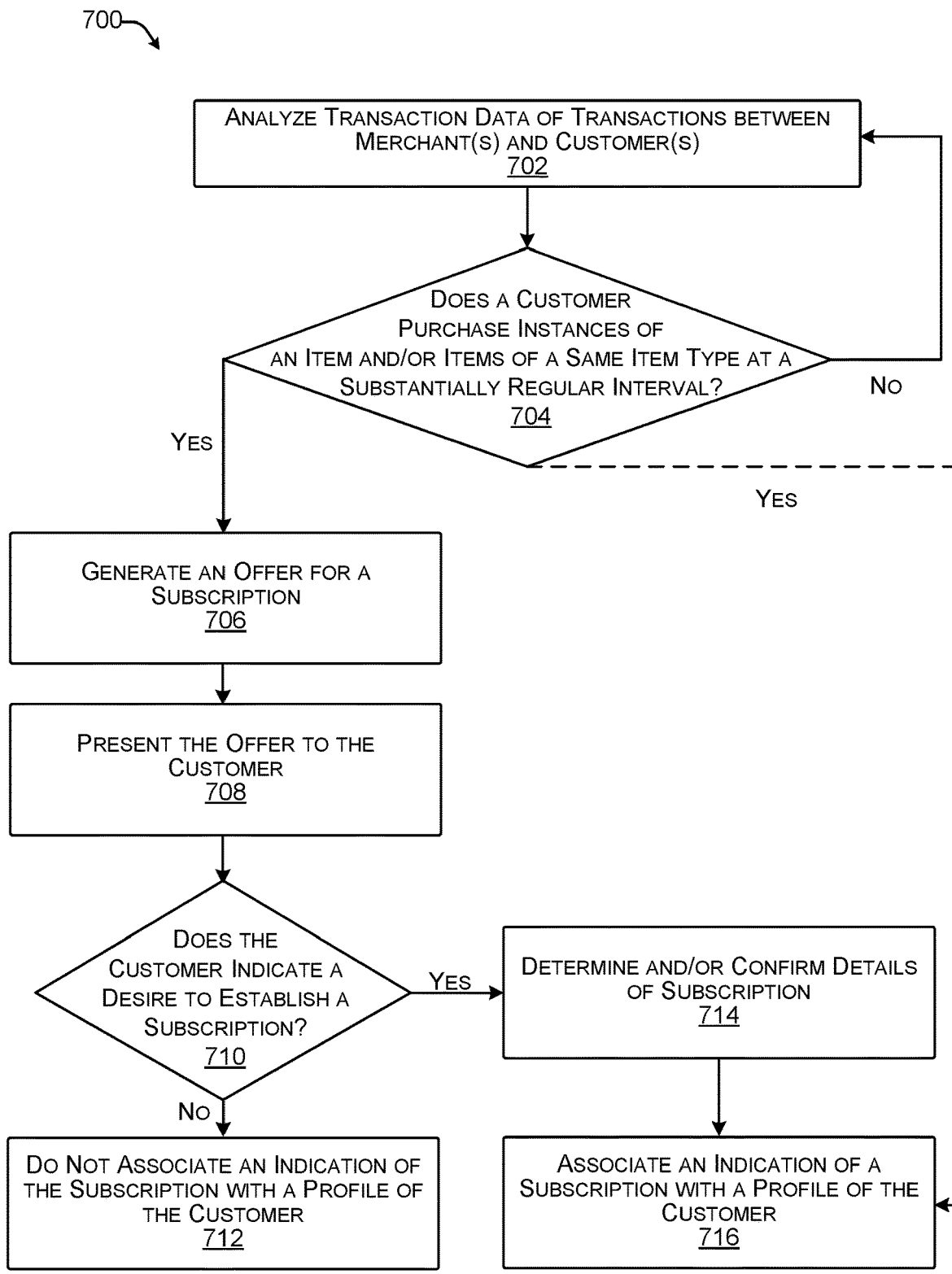
FIG. 7 illustrates an example process for intelligently identifying a subscription opportunity (e.g., for a customer) based at least in part on transaction data as described herein.

FIG. 7 illustrates an example process 700 for intelligently identifying a subscription opportunity (e.g., for a customer) based at least in part on transaction data as described herein.

Block 702 illustrates analyzing transaction data of transactions between merchant(s) and customer(s). As described above, a service provider can store transaction data 120 associated with transactions processed by the service provider (e.g., the payment processing module 114) on behalf of the merchant(s) 108. In at least one example, a data item associated with a transaction can indicate item(s) acquired via a transaction, descriptions of item(s) associated with the transaction, a cost of the individual item(s), a total cost of the transaction, payment data for satisfying the total cost of the transaction, an identity of a customer, an identity of a merchant, a date, time, and/or location associated with the transaction, and so on. In some examples, the transaction data 120 can be associated with transactions that are not processed by the service provider. In such an example, the transaction data can be accessed via a third-party source or system, for instance, via an API or a SDK that enables functionality described herein to be integrated into third-party sources or systems.

In at least one example, the subscription module 112 can utilize machine-trained data models to analyze the transaction data 102. In additional or alternative examples, the subscription module 112 can utilize statistical models, heuristics, or other mechanisms for analyzing the transaction data 120.

Block 704 illustrates determining whether a customer purchases an item and/or item(s) of a same item type at a substantially regular interval. In at least one example, the subscription module 112 can determine that an item (e.g., instances thereof) and/or items of the same item type are purchased by a customer at a substantially regular interval based at least in part on determining, from the transaction data 120, that the customer purchases the item (e.g., instances thereof) and/or the items of the same item type (i) at a particular frequency and/or (ii) after the lapse of subsequent periods of time, wherein the subsequent periods of time differ by less than a threshold. In at least one example, the subscription module 112 can determine, based on the transaction data 120, that a customer purchases a first item at a first time, a second item at a second time, and a third item at a third time. The first item, the second item, and the third item can be instances of a same item (or item type). In at least one example, the first time, the second time, and the third time can be associated with a frequency indicative that the customer purchases instances of an item (or item type) at a substantially regular interval. For example, the subscription module 112 can determine that a customer purchases an item (e.g., instances thereof) and/or items of the same item type at a particular rate (e.g., one time per day, one time per month, one time per certain number of days, one time per week, etc.). In an additional or alternative example, a first period of time between the first time and the second time, and a second period of time between the second time and the third time can be substantially equal. In some examples, the intervals between purchases can be equal. However, in some examples, the intervals between purchases may not be equal. For intervals to be "substantially regular," a difference between individual intervals may be less than a threshold such that the variation between the length of the intervals is minimal. As an example, the subscription module 112 can determine that the customer purchases an item (e.g., instances thereof) and/or items of the same item type in a recurring fashion (e.g., occurring periodically or repeatedly) after the lapse of some period of time (e.g., every 24 hours, every 45 days, every 90 days, etc.).

In at least one example, the subscription module 112 can utilize machine-trained data models to determine that an item (e.g., instances thereof) and/or items of the same item type are purchased by a customer at a substantially regular interval and/or to otherwise identify a pattern indicative of a recurring purchase. In additional or alternative examples, the subscription module 112 can utilize statistical models, heuristics, or other mechanisms for determining that an item (e.g., instances thereof) and/or items of the same item type is purchased by a customer at a substantially regular interval and/or to otherwise identify a pattern indicative of a recurring purchase.

As described above, in some example, factors other than frequency can be considered to determine whether the customer is a candidate for a subscription. For instance, in an example, quantity (e.g., bulk vs. small size), cost (e.g., using coupons, discounts, or selecting a less expensive purchasing option), or the like can be indicative that a customer is a candidate for a subscription. That is, in addition to (or as an alternative to) the frequency with which a customer purchases a same item and/or items of a same item type, the subscription module 112 can additionally or alternatively consider quantity, cost, etc. in determining that a customer qualifies for a subscription.

Block 706 illustrates generating an offer for a subscription. In at least one example, based on determining that a customer purchases an item (e.g., instances thereof) and/or items of the same item type at a substantially regular interval, the subscription module 112 can determine that the customer is eligible and/or qualifies for a subscription. As such, the subscription module 112 can generate an offer for the customer to prompt the customer to set up a subscription, for example, to receive additional items (e.g., instances of the item) periodically without the customer needing to take an action to subsequently receive such additional items. In at least one example, the offer can be associated with an incentive (e.g., a discount, free shipping, etc.).

Block 708 illustrates presenting the offer to the customer. In at least one example, the subscription module 112 can present the offer to the customer to prompt the customer to set up a subscription. In some examples, the subscription module 112 can present such an offer via a POS device of a merchant in association with a transaction being processed at the POS device. In an additional or alternative example, the subscription module 112 can present such an offer via a device of a customer (e.g., a customer device), for example in association with an ecommerce transaction and/or at some other time. In some examples, the offer can be presented via a GUI that is associated with an actuation mechanism that, when actuated, causes the subscription to be set up via a single interaction with the GUI (e.g., a one-click subscription). Non-limiting examples of GUIs for presenting such an offer to the customer are described above with reference to FIGS. 2A and 2B.

As described above, in at least one example, the subscription module 112 can cause an offer for a subscription to be associated with a virtual cart or other GUI presented in association with a checkout flow of a transaction. For instance, the subscription module 112 can cause an offer to be presented while a customer is checking out either at a brick-and-mortar POS or an ecommerce POS. In at least one example, the subscription module 112 can receive an identifier associated with a customer associated with a virtual cart or a transaction being processed at a POS. For example, a customer can "log-in" to an account associated with an ecommerce POS or a customer can provide a loyalty number at a brick-and-mortar POS. In at least one example, payment data can serve as an identifier of a customer, which can be provided to satisfy a cost of a transaction. In at least one example, the device receiving such an identifier (e.g., a customer device or a merchant device) can transmit the identifier to the subscription module 112 and the subscription module 112 can cause an offer to be presented at the POS. In additional or alternative examples, the subscription module 112 can cause an offer for a subscription to be presented at any other time (e.g., prior to, during, or after a transaction).

Block 710 illustrates determining whether the customer indicates a desire to establish a subscription. In at least one example, as described above with reference to FIGS. 2A and 2B, an offer can be associated with an actuation mechanism, that when actuated, sends an indication from a device operable by a user (e.g., a merchant or a customer) to the server(s) 102. Such an indication can indicate that the customer desires to establish a subscription. Additional or alternative inputs can be provided to indicate that the customer desires to establish a subscription. If the customer does not actuate the actuation mechanism (e.g., within a threshold period of time) or otherwise indicates that he or she does not desire to establish a subscription, the subscription module 112 can refrain from associating an indication of a subscription with a profile of the customer, as illustrated in block 712. That is, the subscription module 112 can refrain from creating a subscription for the customer. In at least one example, responsive to the customer declining an offer for a subscription, such a subscription may not be presented to the customer again until after a prescribed amount of time has lapsed. In some examples, the past offers (and customer's responses) may be used to adjust future offers.

Block 714 illustrates determining and/or confirming details of a subscription. In at least one example, responsive to receiving an indication that the customer desires to establish a subscription, the subscription module 112 can cause additional information to be presented to the customer prior to associating the subscription with the profile of the customer. For instance, the subscription module 112 can prompt the customer to input a fulfillment method (e.g., pick-up (e.g., from a particular merchant and/or merchant(s) the customer frequents), ship to home, delivery, etc.), an address (if necessary and/or not already stored in association with a profile of the customer), payment data (if not already stored in association with a profile of the customer), etc. Furthermore, the subscription module 112 can prompt the customer to input and/or confirm quantity per installment, frequency of installments, interval between installments, etc. In some examples, at least some of the details of the subscription can be determined based on customer buying patterns observed from the transaction data 120. For example, if the transaction data 120 indicates that a customer ships an item to their home, the fulfillment method can be auto-populated to "ship to home." Additionally or alternatively, the quantity, frequency, interval between installments, etc. can be auto-populated based on customer buying patterns observed from the transaction data 120. In some examples, such buying habits can be associated with the customer (e.g., personalized) or one or more other customers, which may be similar to the customer (e.g., customized). Customers can be similar to one another if customer data associated with their profiles are associated with a similarity score that meets or exceeds a threshold, for example.

Block 716 illustrates associating an indication of a subscription with a profile of the customer. Responsive to a customer indicating a desire to establish a subscription and/or determining and/or confirming details of the subscription, the subscription module 112 can associate an indication of the subscription with a profile of the customer. Such an indication can cause the profile of the customer to be associated with a subscription the is associated with an "active" subscription status (e.g., for the item). In at least one example, the subscription module 112 can send a subscription confirmation to the customer (e.g., a device associated therewith) and, in some examples, can reserve inventory for fulfillment of one or more installments of the subscription.

In at least one example, merchant(s) associated with the subscription can have previously opted into a program for offering subscriptions. In additional or alternative examples, responsive to the details of the subscription being determined, the subscription module 112 can send an indication of the subscription, and associated details, to one or more merchants. In at least one example, a first-in-time merchant to respond can be determined to be the merchant associated with the subscription. In additional or alternative examples, such merchants can bid on such a subscription and the subscription module 112 can select a highest bidding merchant. In at least one example, the subscription module 112 can associate an indication of the subscription with a profile of the merchant selected for the subscription.

In some examples, the subscription module 112 can create a subscription without input from the customer (e.g., automatically), as shown by the dashed line from block 704 to block 716. For instance, based at least in part on determining that a customer purchases an item and/or item(s) of a same item type at a substantially regular interval, the subscription module 112 can associate an indication of a subscription with a profile of the customer, as illustrated in block 716. Additional details are described below with reference to FIG. 8.

Figure 8:
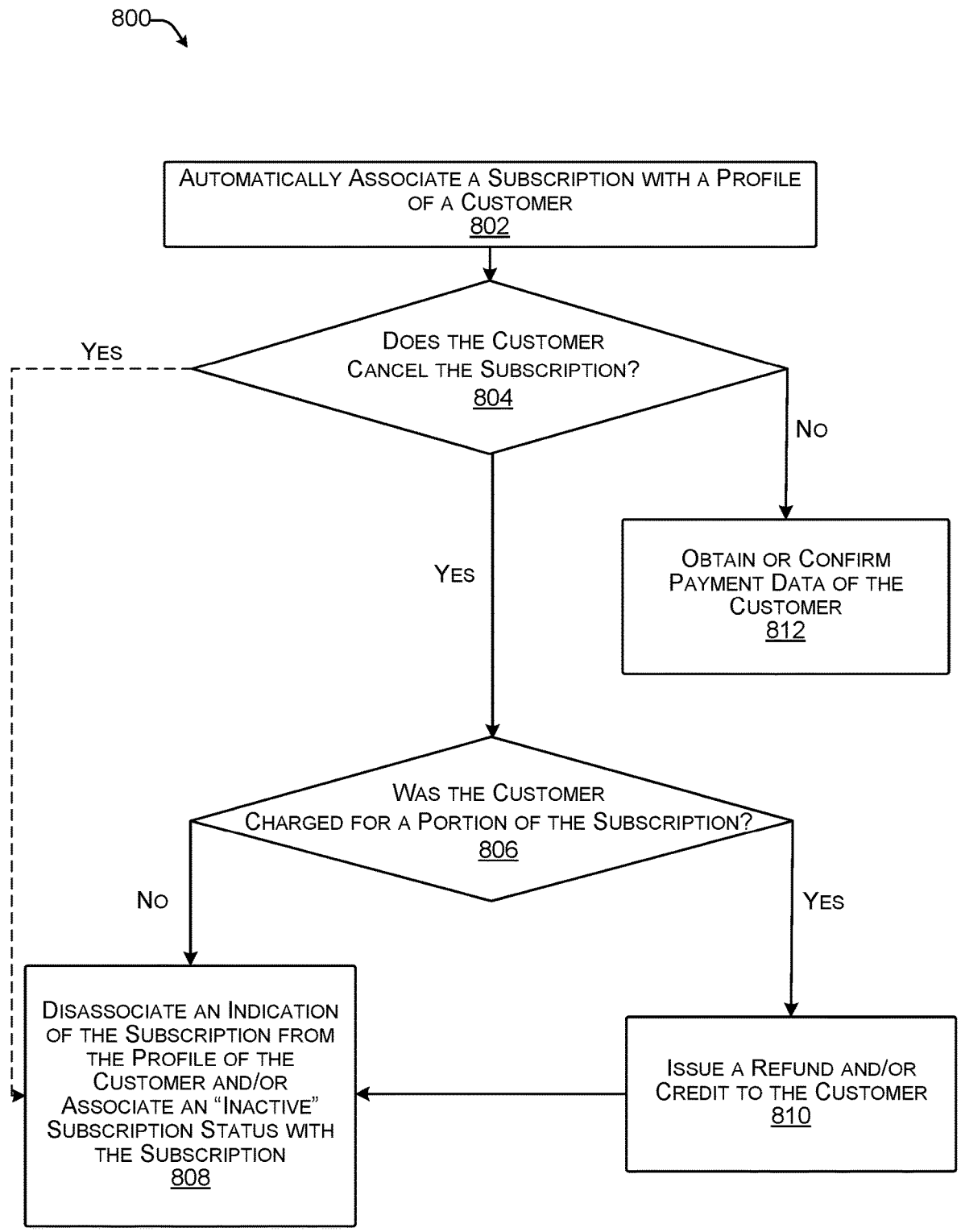
FIG. 8 illustrates an example process for intelligently identifying a subscription opportunity (e.g., for a merchant) based at least in part on transaction data as described herein.

FIG. 8 illustrates an example process 800 for automatically creating a subscription for a customer as described herein.

Block 802 illustrates automatically associating a subscription with a profile of a customer. In some examples, the subscription module 112 can create a subscription without input from the customer. For instance, based at least in part on determining that a customer purchases an item (e.g., instances thereof) and/or item(s) of a same item type at a substantially regular interval, the subscription module 112 can associate an indication of a subscription with a profile of the customer without prompting the customer to accept an offer for a subscription or otherwise take any other action to create the subscription. That is, the subscription module 112 can automatically cause the profile of the customer to be associated with a subscription that is associated with an "active" subscription status (e.g., for the item). In some examples, the first installment can be offered to the customer for no charge (e.g., the service provider pays the installment, the merchant provides the item at no cost, etc.) and the customer can be charged for subsequent installments.

Block 804 illustrates determining whether the customer cancels the subscription. If the customer does not want to create a subscription for the item, the customer can cancel the subscription. In at least one example, the subscription module 112 can send a customer (e.g., a device associated therewith) an option to cancel (e.g., in association with a notification of a first installment). For example, such an option can be provided via a text message, email, push notification, etc. The customer can interact with the text message, email, push notification, etc. to cancel the subscription. In an additional or alternative example, the customer can access a hub, dashboard, or other GUI that enables the customer to manage his or her subscriptions and can request to cancel the subscription via the hub, dashboard, or other GUI. An example of such a GUI is provided in FIG. 5.

Block 806 illustrates determining whether the customer was charged for a portion of the subscription. In at least one example, if a subscription is not associated with a free trial period and if customer has stored his or her payment data (e.g., card-on-file), the customer may be charged for the first installment of the subscription (e.g., if the customer does not cancel prior to the first installment). In at least one example, if the customer does not want to create a subscription for the item, the customer can cancel the subscription and if the customer is charged for the first installment, the service provider can refund and/or credit the customer for the cost of the item.

Block 808 illustrates disassociating an indication of the subscription from the profile of the customer and/or associating an "inactive" subscription status with the subscription. In at least one example, the subscription module 112 can receive an indication that the customer desires to cancel the subscription and, if the customer cancels the subscription and the customer was not charged for a portion of the subscription, the subscription module 112 can disassociate an indication of the subscription from the profile of the customer and/or the subscription can be associated with an "inactive" subscription status. In some examples, if a subscription is associated with a trial period and/or a pre-paid service that has an end date (e.g., the last day of the month, etc.), the subscription module 112 can refrain from dissociating the indication of the subscription from the profile of the customer and/or associating an "inactive" subscription status with the subscription until the end date. That is, the subscription can remain active until the end date.

Block 810 illustrates issuing a refund and/or credit to the customer. In at least one example, the subscription module 112 can receive an indication that the customer desires to cancel the subscription and, if the customer was charged for a portion of the subscription, the subscription module 112 can transfer funds corresponding to the portion of the subscription (e.g., a cost of an item associated with the first installment) into an account of the customer. In some examples, the funds can be deposited into a bank account of the customer that is associated with the payment data stored in association with the service provider (e.g., a linked bank account). In other examples, the funds can be deposited into an account maintained by the service provider, as described above. After the customer is refunded and/or credited, the subscription module can disassociate the indication of the subscription from the profile of the customer and/or the subscription can be associated with an "inactive" subscription status, as illustrated in block 808.

In some examples, the subscription module 112 can proceed directly to block 808 and disassociate the subscription from the profile of the customer and/or cause the subscription to be associated with an "inactive" subscription status (as shown by the dashed line from block 804 to block 808). That is, in some examples, the subscription module 112 may not consider whether a customer was charged prior to disassociating the subscription from the profile of the customer and/or causing the subscription to be associated with an "inactive" subscription status.

Block 812 illustrates obtaining or confirming payment data of the customer. In at least one example, if the customer does not cancel the subscription, the subscription module 112 can determine whether payment data is stored in association with a profile of the customer (e.g., in the profile(s) 116). In some examples, such payment data can include account information associated with a bank account linked to the profile of the customer. In other examples, the payment data can include account information associated with an account maintained by the service provider. In some examples, if payment data is stored in association with the profile of the customer, the subscription module 112 can prompt the customer to confirm that the customer would like to use the payment data to pay for the subscription. In other examples, the subscription module 112 can use the payment data without prompting the customer (e.g., if the customer has previously agreed that such payment data can be used). If the payment data is not stored in association with the profile, the subscription module 112 can prompt the customer to provide payment data for satisfying a cost of the transaction. In some examples, the subscription module 112 can prompt the customer to provide other details associated with the subscription in association with obtaining or confirming their payment data.

In at least one example, prior to a customer providing payment data and/or such payment data being processed (successfully), the profile of the customer can be associated with a subscription that is associated with a "pending" subscription status. If the payment data is not successful, the profile of the customer may be associated with a subscription that is associated with an "in grace" subscription status until the payment data is processed (successfully) or the customer becomes delinquent, at which time the subscription module 112 can associate an "inactive" subscription status with the subscription and/or disassociate the indication of the subscription from the profile of the customer.

Figure 9:
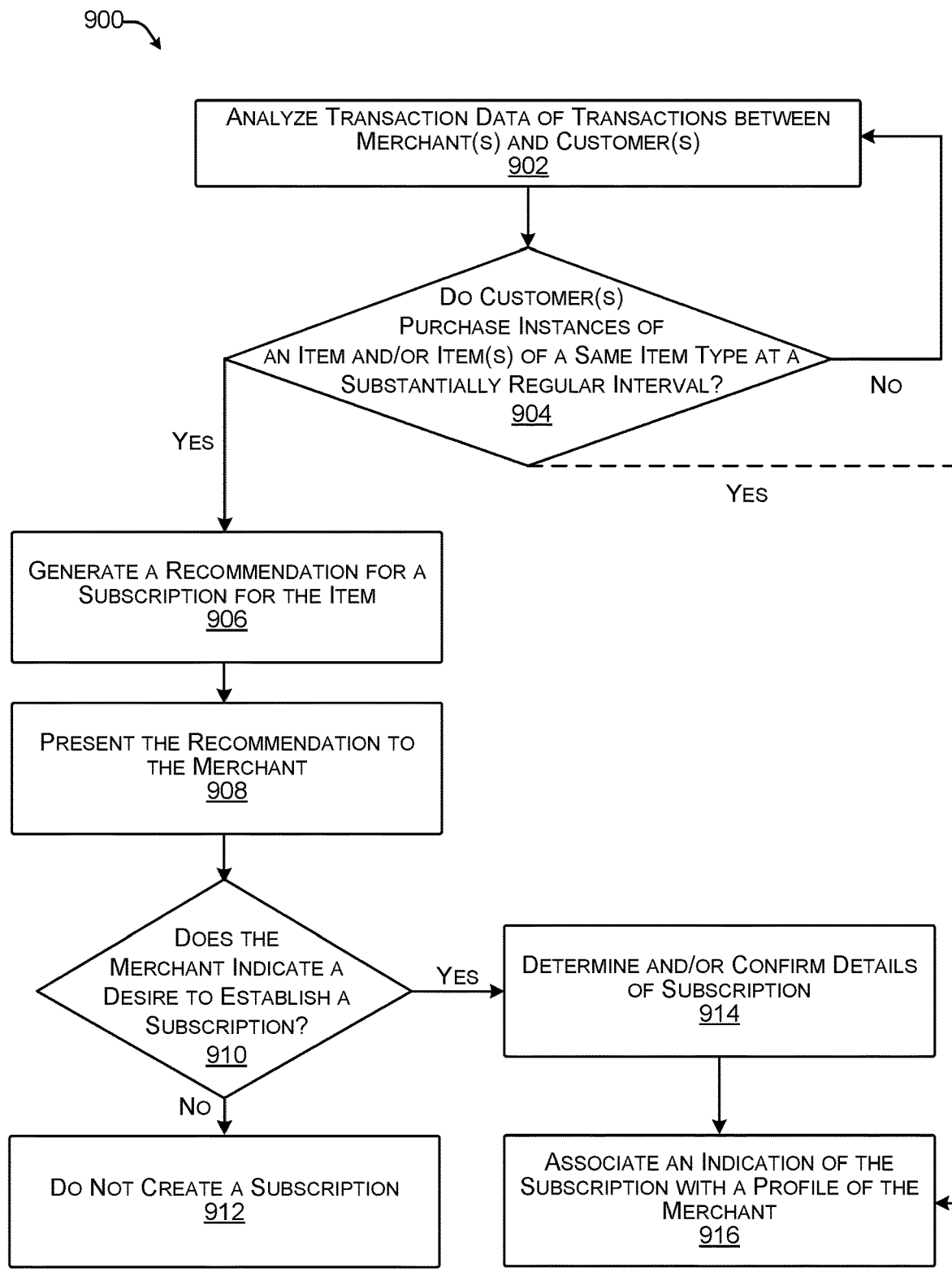
FIG. 9 illustrates an example process for automatically creating a subscription for a customer as described herein.

FIG. 9 illustrates an example process 900 for intelligently identifying a subscription opportunity (e.g., for a merchant) based at least in part on transaction data as described herein.

Block 902 illustrates analyzing transaction data of transactions between merchant(s) and customer(s). As described above, a service provider can store transaction data 120 associated with transactions processed by the service provider (e.g., the payment processing module 114) on behalf of the merchant(s) 108. In at least one example, a data item associated with a transaction can indicate item(s) acquired via a transaction, descriptions of item(s) associated with the transaction, a cost of the individual item(s), a total cost of the transaction, payment data for satisfying the total cost of the transaction, an identity of a customer, an identity of a merchant, a date, time, and/or location associated with the transaction, and so on. In some examples, the transaction data 120 can be associated with transactions that are not processed by the service provider. In such an example, the transaction data can be accessed via a third-party source or system, for instance, via an API or a SDK that enables functionality described herein to be integrated into third-party sources or systems. In at least one example, the subscription module 112 can analyze transaction data 120. In at least one example, the subscription module 112 can utilize machine-trained data models to analyze the transaction data 120. In additional or alternative examples, the subscription module 112 can utilize statistical models, heuristics, or other mechanisms for analyzing the transaction data 120.

Block 904 illustrates determining whether customer(s) purchase an item and/or item(s) of a same item type at a substantially regular interval. That is, in at least one example, the subscription module 112 can analyze transaction data 120 and can determine that one or more customers purchase an item (e.g., instances thereof) and/or items of the same item type at a substantially regular interval. In at least one example, the subscription module 112 can determine that an item (e.g., instances thereof) and/or items of the same item type are purchased by one or more customers at a substantially regular interval based at least in part on determining, from the transaction data 120, that the one or more customers purchase the item (e.g., instances thereof) and/or the items of the same item type (i) at a particular frequency and/or (ii) after the lapse of subsequent periods of time, wherein the subsequent periods of time differ by less than a threshold. In at least one example, the subscription module 112 can determine, based on the transaction data 120, that one or more customers purchase a first item at a first time, a second item at a second time, and a third item at a third time. The first item, the second item, and the third item can be instances of a same item (or item type). In at least one example, the first time, the second time, and the third time can be associated with a frequency indicative that the customer(s) purchase instances of an item (or item type) at a substantially regular interval. For example, the subscription module 112 can determine that one or more customers purchase an item (e.g., instances thereof) and/or items of the same item type at a particular rate (e.g., one time per day, one time per month, one time per certain number of days, one time per week, etc.). In an additional or alternative example, a first period of time between the first time and the second time, and a second period of time between the second time and the third time can be substantially equal. In some examples, the intervals between purchases can be equal. However, in some examples, the intervals between purchases may not be equal. For intervals to be "substantially regular," a difference between individual intervals may be less than a threshold such that the variation between the length of the intervals is minimal. As an example, the subscription module 112 can determine that one or more customers purchase an item (e.g., instances thereof) and/or the items of the same item type in a recurring fashion (e.g., occurring periodically or repeatedly) after the lapse of some period of time (e.g., every 24 hours, every 45 days, every 90 days, etc.).

In at least one example, the subscription module 112 can utilize machine-trained data models to determine that an item type is purchased by one or more customers at a substantially regular interval and/or to otherwise identify a pattern indicative of a recurring purchase. In additional or alternative examples, the subscription module 112 can utilize statistical models, heuristics, or other mechanisms for determining that an item type is purchased by one or more customers at a substantially regular interval and/or to otherwise identify a pattern indicative of a recurring purchase.

As described above, in some example, factors other than frequency can be considered to determine whether an item type is a candidate for a subscription. For instance, in an example, quantity (e.g., bulk vs. small size), cost (e.g., using coupons, discounts, or selecting a less expensive purchasing option), or the like can be indicative that an item type is a candidate for a subscription. That is, in addition to (or as an alternative to) the frequency with which customers purchase a same item and/or items of a same item type, the subscription module 112 can additionally or alternatively consider quantity, cost, etc. in determining that an item qualifies for a subscription.

Block 906 illustrates generating a recommendation for a subscription. In at least one example, based on determining that one or more customers purchase an item and/or item(s) of the same item type at a substantially regular interval, the subscription module 112 can generate a recommendation to recommend that a merchant set up or otherwise offer a subscription. Furthermore, in some examples, the recommendation can be associated with a recommended price for the item (e.g., per installment), a recommended frequency for fulfilling installments of the subscription, a recommended interval between installments, a recommended quantity of items associated with each installment, etc. In at least one example, the recommended price, recommended frequency, recommended interval, recommended quantity, etc. can be based at least in part on customer buying patterns observed from the transaction data 120.

Block 908 illustrates presenting the recommendation to the merchant. In at least one example, the subscription module 112 can present such a recommendation via a POS device of a merchant in association with a transaction being processed at the POS device. In an additional or alternative example, the subscription module 112 can present such a recommendation via a device of a merchant (e.g., a merchant device) at some other time. In some examples, the recommendation can be presented via a GUI that is associated with an actuation mechanism that, when actuated, causes the subscription to be set up via a single interaction with the GUI (e.g., a one-click subscription). An example of such a GUI is described above with reference to FIG. 4A. In at least one example, the recommendation can be associated with an incentive (e.g., a discount, discounted service, supplementary service, etc.) to incentivize the merchant to create a subscription for the item. Responsive to a merchant indicating a desire to create a subscription, the subscription module 112 can associate an indication of the subscription with a profile of the merchant.

Block 910 illustrates determining whether the merchant indicates a desire to establish a subscription. In at least one example, as described above with reference to FIG. 4A, a recommendation can be associated with an actuation mechanism, that when actuated, sends an indication from a device operable by the merchant (e.g., one of the merchant device(s) 104) to the server(s) 102. Such an indication can indicate that the merchant desires to establish a subscription. The merchant can provide additional or alternative inputs to indicate a desire to establish a subscription. If the merchant does not actuate the actuation mechanism (e.g., within a threshold period of time) or otherwise indicates that it does not desire to establish a subscription, the subscription module 112 can refrain from associating a subscription with a profile of the merchant, as illustrated in block 912. That is, the subscription module 112 can refrain from creating a subscription for the merchant.

Block 914 illustrates determining and/or confirming details of a subscription. In at least one example, responsive to receiving an indication that the merchant desires to establish a subscription, the subscription module 112 can cause additional information to be presented to the customer prior to associating the subscription with the item in an inventory of the merchant. For instance, the subscription module 112 can prompt the merchant to identify possible fulfillment methods (e.g., pick-up, ship to home, fulfillment, etc.), input and/or confirm quantity, frequency of installments, intervals between installments, etc. In some examples, at least some of the details of the subscription can be determined based on customer buying patterns observed from the transaction data 120.

In at least one example, the subscription module 112 can access data associated with the merchant and/or other merchants associated with the service provider to recommend details associated with the subscription. For example, the subscription module 112 can access inventory of a merchant to determine a price for the subscription. In some examples, the subscription module 112 can consider subscriptions offered by other merchants (e.g., for the same or similar item) and can recommend a price based on such subscriptions. In at least one example, the subscription module 112 can recommend a price within a price range for which a merchant agrees to offer a subscription. Further, in some examples, the subscription module 112 can generate a confidence score indicating whether a subscription is likely to lead to increased sales, revenue, repeat customers, etc. In at least one example, subscription interactions of customer(s) and/or merchant(s) can be used to generate the confidence score.

Block 916 illustrates associating an indication of a subscription with a profile of the merchant. Responsive to a merchant indicating a desire to create a subscription, the subscription module 112 can associate an indication of the subscription with a profile of the merchant. That is, the subscription module 112 can associate an indication of the subscription with a data item corresponding to the item in the inventory data 118 (e.g., which can be associated with the profile of the merchant) and the indication of the subscription can be associated with an "active" subscription status. In at least one example, the subscription module 112 can send a subscription confirmation to the merchant (e.g., a device associated therewith) and, in some examples, can reserve inventory for fulfillment of one or more installments of the subscription.

In some examples, the subscription module 112 can create a subscription without input from the merchant, as shown by the dashed line from block 904 to block 916. For instance, based at least in part on determining that customer(s) purchase an item and/or item(s) of a same item type at a substantially regular interval, the subscription module 112 can associate an indication of the subscription with a profile of the merchant, as illustrated in block 916. Additional details are described below with reference to FIG. 10.

Figure 10:
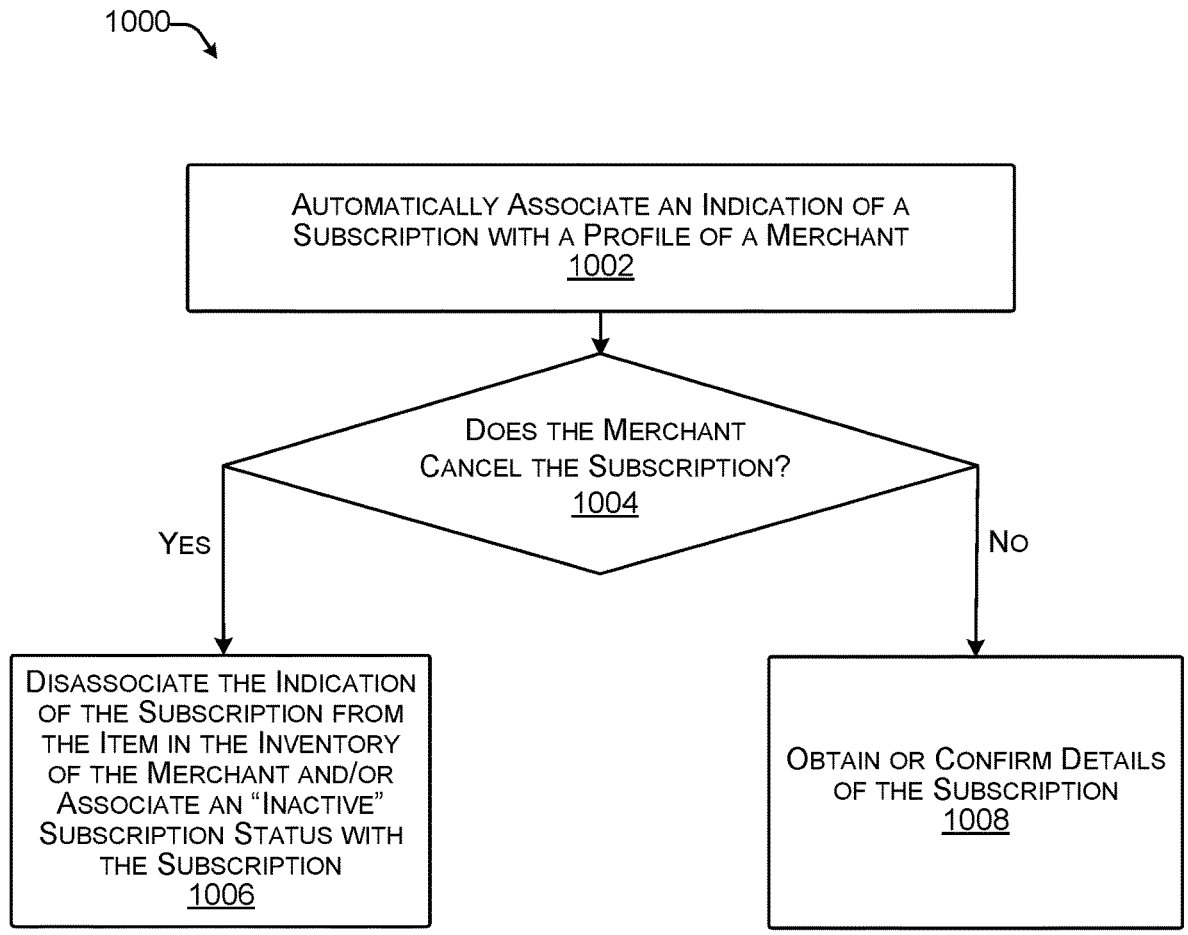
FIG. 10 illustrates an example process for automatically creating a subscription for a merchant as described herein.

FIG. 10 illustrates an example process 1000 for automatically creating a subscription for a merchant as described herein.

Block 1002 illustrates automatically associating an indication of the subscription with a profile of the merchant. In some examples, the subscription module 112 can create a subscription without input from the merchant. For instance, based at least in part on determining that one or more customers purchase an item (e.g., instances thereof) and/or item(s) of a same item type at a substantially regular interval, the subscription module 112 can associate an indication of a subscription with an item in an inventory of the merchant. That is, the subscription module 112 can automatically associate an indication of the subscription with a data item corresponding to the item in the inventory data 118 (e.g., which can be associated with the profile of the merchant) and the indication of the subscription can be associated with an "active" subscription status.

Block 1004 illustrates determining whether the merchant cancels the subscription. If the merchant does not want to create a subscription for the item, the merchant can cancel the subscription. In at least one example, the subscription module 112 can send a merchant (e.g., a device associated therewith) an option to cancel (e.g., in association with a notification of a first installment). For example, such an option can be provided via a text message, email, push notification, etc. The merchant can interact with the text message, email, push notification, etc. to cancel the subscription. In an additional or alternative example, the merchant can access a hub, dashboard, or other GUI that enables the merchant to manage its subscriptions and can request to cancel the subscription via the hub, dashboard, or other GUI. An example of such a GUI is provided above with respect to FIG. 6.

Block 1006 illustrates disassociating an indication of the subscription from the profile of the merchant and/or associating an "inactive" status with the subscription. In at least one example, the subscription module 112 can receive an indication that the merchant desires to cancel the subscription and, if the merchant cancels the subscription, the subscription module 112 can disassociate the indication of the subscription from the profile of the merchant and/or the subscription can be associated with an "inactive" status.

In at least one example, if the merchant cancels the subscription, the subscription module 112 can move the subscription to another merchant that is similar to the merchant and/or offers the same or a similar item. In such an example, customer(s) who have subscribed to the subscription can still receive items via a subscription (even though the items are being received by a different merchant). In some examples, such a move can be communicated to the customer(s). In other examples, the customer(s) may not know that a different merchant is fulfilling their subscription.

Block 1008 illustrates obtaining or confirming details of the subscription. In at least one example, based at least in part on the merchant opting not to cancel the subscription, the subscription module 112 can prompt the merchant to input and/or confirm details associated with the subscription. For instance, the subscription module 112 can prompt the merchant to provide details associated with the subscription (e.g., pricing, frequency, fulfillment options, etc.).

Figure 11:
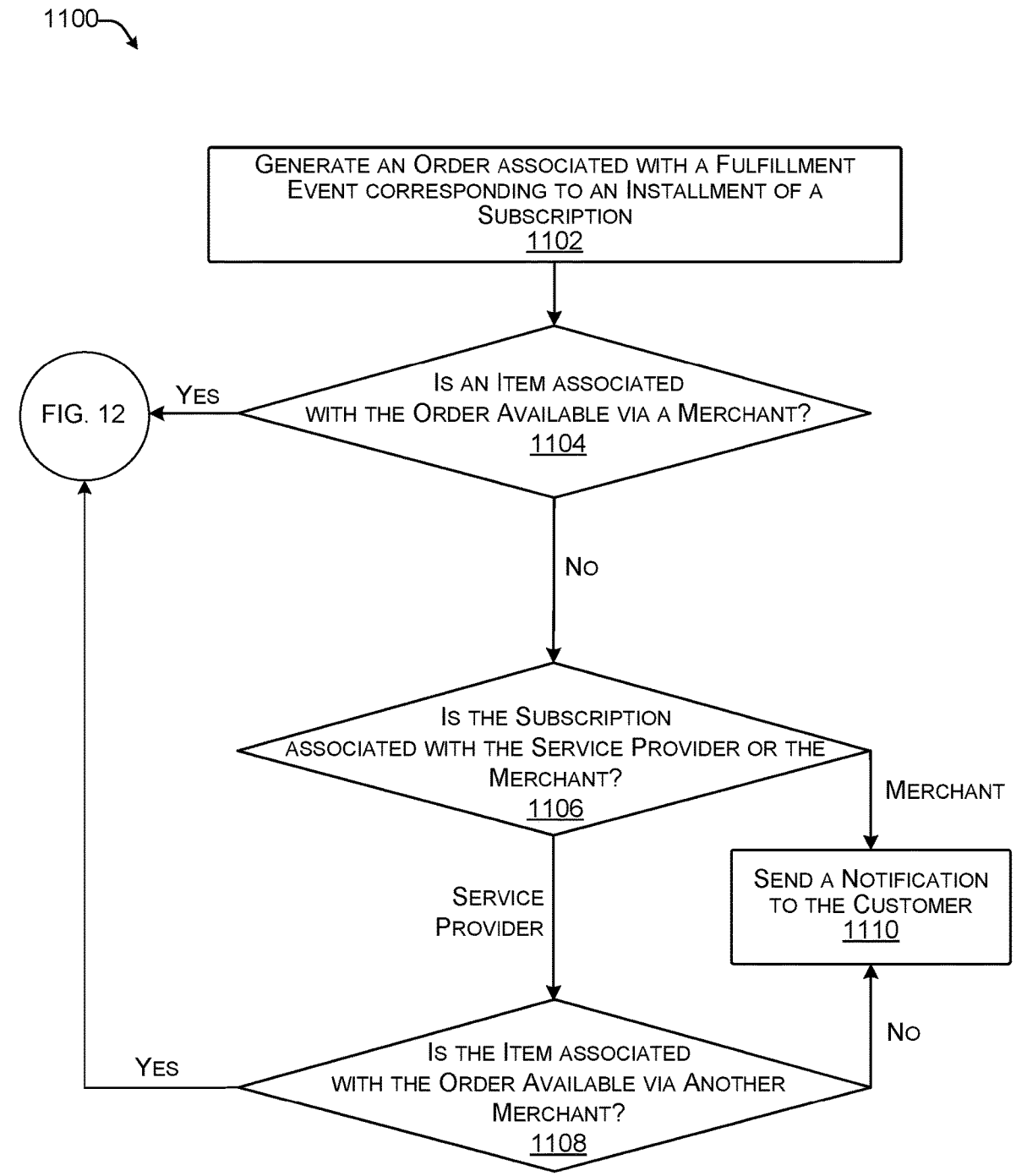
FIG. 11 illustrates an example process for fulfilling an installment of a subscription as described herein.

FIG. 11 illustrates an example process 1100 for fulfilling an installment of a subscription as described herein.

Block 1102 illustrates generating an order associated with a fulfillment event corresponding to an installment of a subscription. In at least one example, in anticipation of a fulfillment event associated with an installment of a subscription, the subscription module 112 can generate an order associated with the installment of the subscription. In at least one example, the order can indicate an item, a date for fulfillment, and instructions for fulfillment. In at least one example, the item can be an instance of an item (and/or item type) that gave rise to the subscription described herein.

Block 1104 illustrates determining whether the item associated with the order is available via a merchant. In at least one example, the subscription module 112 can determine whether the item associated with the order is available in an inventory of a merchant and can be fulfilled on (or near) the date for fulfillment in compliance with the instructions for fulfillment associated with the order. If an item is available from the merchant, the process 1100 can proceed to process 1200 described below with reference to FIG. 12. If an item is not available from the merchant, the process 1100 can proceed to block 1106.

Block 1106 illustrates determining whether the subscription is associated with the service provider or the merchant. In at least one example, a customer can establish a subscription with an individual merchant. In such an example, an indication of the subscription can be associated with a profile of the merchant and the subscription module 112 can fulfill the subscription using inventory of the merchant. In other examples, a customer can establish a subscription with the service provider, and the subscription module 112 can fulfill the subscription using inventory of one or more merchants associated with the service provider. That is, the service provider can be agnostic to which merchant it uses to fulfill fulfillment of an item to the customer (e.g., so long as the merchant can satisfy conditions of the subscription such as item type, fulfillment date, fulfillment method, etc.).

Block 1108 illustrates determining whether an item associated with the order is available via another merchant. If the subscription is with the service provider, the subscription module 112 can look to inventory of another merchant to determine whether the item associated with the order is available in an inventory of the other merchant and can be fulfilled on (or near) the date for fulfillment in compliance with the instructions for fulfillment associated with the order. If an item is available from the other merchant, the process 1100 can proceed to process 1200 described below with reference to FIG. 12.

Block 1110 illustrates sending a notification to the customer. In at least one example, if the subscription is with the merchant and the merchant cannot fulfill the order, the subscription module 112 can send a notification to the customer (e.g., a device associated therewith). Further, if the subscription is associated with the service provider, the subscription module 112 can look to inventories of other merchants to fulfill the order. However, if no other merchant associated with the service provider can fulfill the order, the subscription module 112 can send a notification to the customer (e.g., a device associated therewith). In some examples, the notification can be sent via text message, email, push notification, or the like. In at least one example, the notification can inform the customer that the installment is unable to be fulfilled. In some examples, the notification can include an incentive for the customer (e.g., to compensate for the inconvenience, to incentivize the customer not to cancel the subscription, etc.). In an additional or alternative example, the notification can include an indication that the installment is able to be fulfilled, but such fulfillment may be delayed. In some examples, the notification can include an option for an alternate item, which may be different than the item associated with the subscription but is substantially similar to the item. For example, the alternate item may be associated with a different brand, a different volume, a different size, etc. In some examples, the alternate item may be associated with a different merchant than the merchant with whom the subscription is associated.

Figure 12:
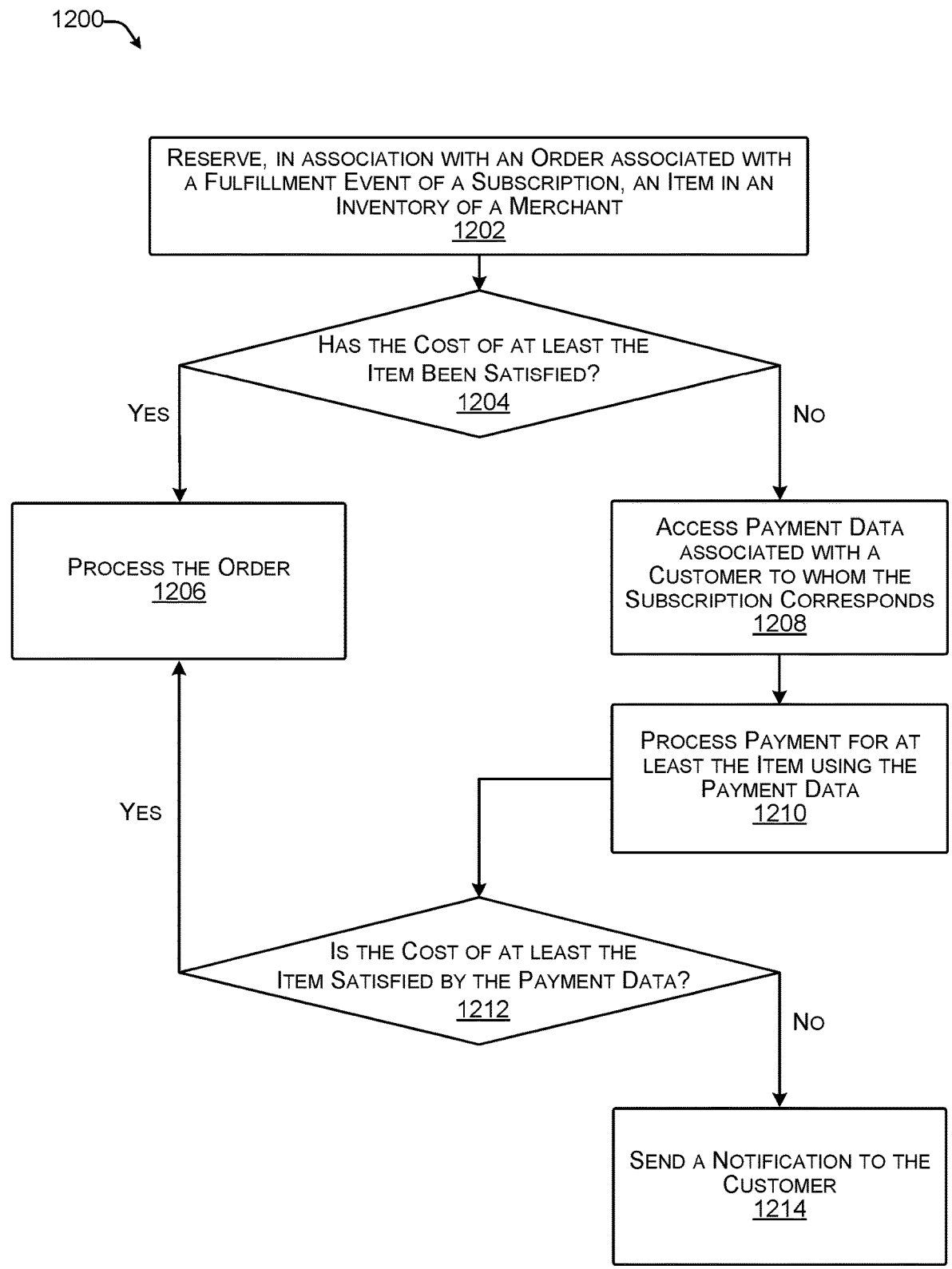
FIG. 12 illustrates an example process associated with additional details for fulfilling an installment of a subscription as described herein.

FIG. 12 illustrates an example process 1200 associated with additional details for fulfilling an installment of a subscription as described herein.

Block 1202 illustrates reserving, in association with an order associated with a fulfillment event of a subscription, an item in an inventory of a merchant. Based at least in part on determining that a merchant can fulfill the order, the subscription module 112 can send a request (e.g., to the merchant) to reserve the item in the inventory of the merchant. In at least one example, when an item is reserved it can be associated with an indication of such in the inventory data 118. In some examples, an order can be associated with a single item. In other examples, an order can be associated with multiple items, for example, in association with a bundled subscription.

Block 1204 illustrates determining whether the cost of at least the item has been satisfied. In at least one example, a customer can pay for items associated with the subscription via a lump sum payment (a single payment paid at some frequency less than the frequency at which items are delivered (or otherwise provided) to the customer) or in association with each installment of the subscription (e.g., each time an item is delivered (or otherwise provided) to the customer). Fees associated with subscriptions and/or installments associated therewith can be flat fees, custom fees, tiered fees, unit-based, etc. In some examples, a customer can provide payment data for satisfying the cost of the items associated with the subscription at the time the subscription is created and can pay for the cost of the subscription in a lump sum payment (a single payment paid at some frequency less than the frequency at which items are delivered (or otherwise provided) to the customer). In at least one example, if the cost of at least the item has been paid in association with the subscription at the time the subscription is created, the payment processing module 114 can notify the subscription module 112 and the subscription module 112 can process the order, as illustrated in block 1206.

Block 1206 illustrates processing the order. In at least one example, the subscription module 112 can send a fulfillment instruction to the merchant to fulfill the order. In some examples, the fulfillment instruction can be associated with shipping instructions, a pre-made shipping label, etc. In additional or alternative examples, the subscriber module 112 can recommend packaging for the item and/or can include tips regarding facilitating a frictionless pick-up process (e.g., security considerations, skip-the-line options, etc.).

Block 1208 illustrates accessing payment data associated with a customer to whom the subscription corresponds. In at least one example, the payment processing module 114 can receive an instruction to process payment for the order. The payment processing module 114 can access the profile(s) 116 to determine whether a profile of the customer is associated with payment data.

In some examples, a customer can have previously agreed to store payment data on file with the service provider (e.g., in a profile of the profile(s) 116) and such payment data can be used, by the payment processing module 114, to process payment for the items associated with the subscription. In additional or alternative examples, a customer can provide payment data for satisfying the cost of the items associated with the subscription at the time the subscription is created or in association with an installment of the subscription. In such examples, the payment data can be stored (e.g., by the service provider) for subsequent use, by the payment processing module 114, to process payment paying for subsequent installments of the subscription. In such examples, if the profile is associated with payment data, the payment processing module 114 can access the payment data and can process payment for at least the cost of the item, as illustrated in block 1210. In at least one example, payment data can be provided, saved, and/or used in association with any POS or ecommerce interactions where the service provider is the payment processor.

If the profile of the customer is not associated with payment data, the payment processing module 114 can prompt the customer for payment data, unless the subscription module 112 has indicated that the customer need not pay for the order (e.g., the first installment, etc.). Upon receiving payment data from the customer, the payment processing module 114 can process payment for at least the cost of the item, as illustrated in block 1210.

Block 1212 illustrates determining whether the cost of at least the item is satisfied by the payment data. In at least one example, the payment processing module 114 can determine whether an account associated with the payment data is sufficient to satisfy a cost of at least the item. For example, the payment processing module 114 can send an authorization request to a payment service associated with the payment data, which may be associated with a linked bank account, a credit card, etc. The payment service can provide a response to the request that indicates whether an account associated with the payment data has enough funds to satisfy the cost of at least the item. If the account has sufficient funds, the authorization request can be approved and the payment processing module 114 can notify the subscription module 112. The subscription module 112 can then process the order, as illustrated in block 1206. If the authorization request is not approved (e.g., declined), the payment processing module 114 can send a notification to the customer to inform the customer that the payment data is not approved and/or the cost of at least the item is not satisfied. In some examples, the notification can prompt the customer to provide updated payment data.

In some examples, the payment data can be associated with an account maintained by the service provider. In such examples, the payment processing module 114 can access the account maintained by the service provider to determine whether the account is associated with sufficient funds to satisfy the cost of at least the item. If the account has sufficient funds, the payment processing module 114 can notify the subscription module 112. The subscription module 112 can then process the order, as illustrated in block 1206. If the authorization request is not approved (e.g., declined), the payment processing module 114 can send a notification to the customer to inform the customer that the payment data is not approved and/or the cost of at least the item is not satisfied. In some examples, the notification can prompt the customer to provide updated payment data.

In at least one example, the payment processing module 114 can process payments for items fulfilled via a subscription, as described above. In some examples, revenue generated from payment for items associated with subscriptions can be deposited into an account of the merchant which is maintained by the service provider. In at least one example, such an account can be funded by revenue generated by transactions processed by the payment processing module 114 on behalf of the merchant.

Figure 13:
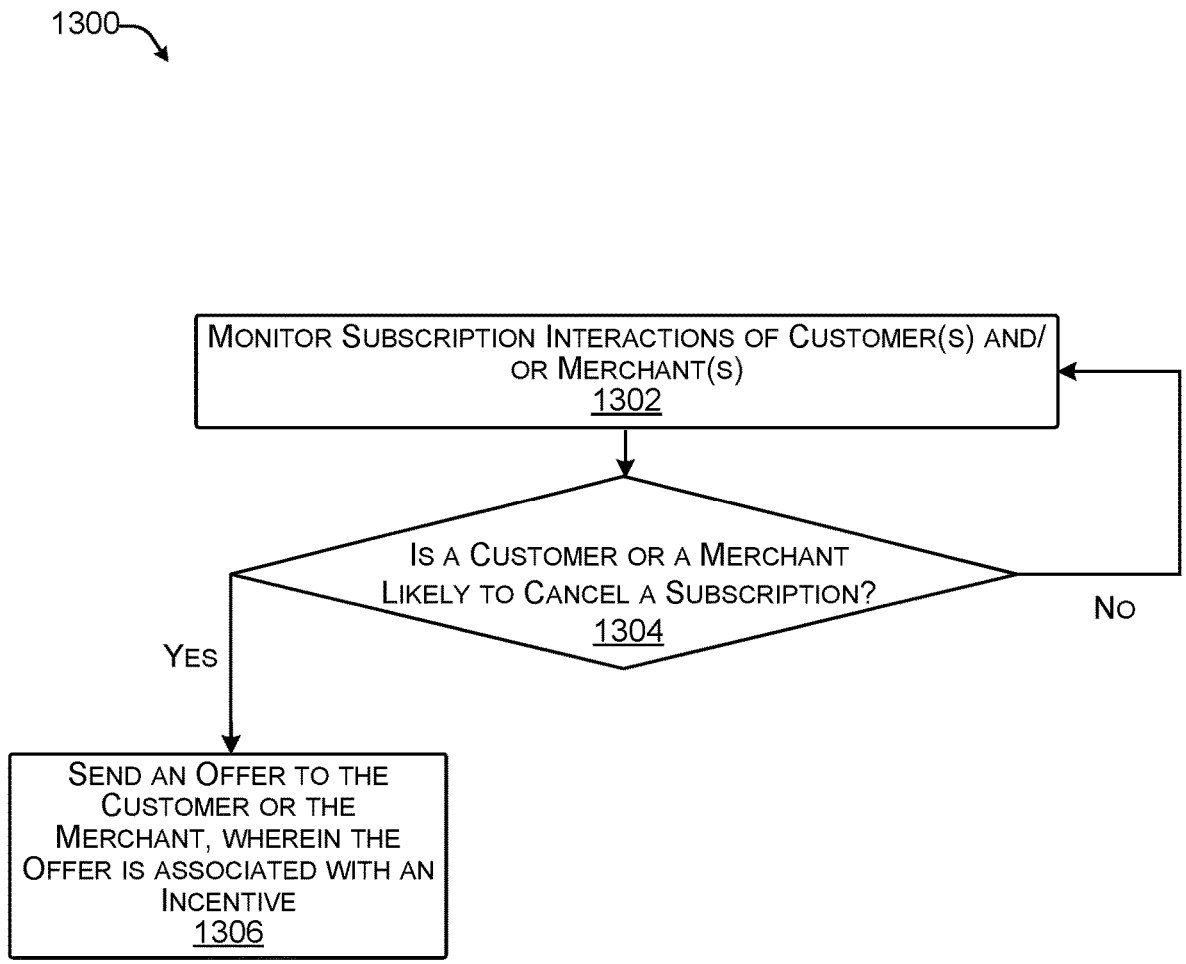
FIG. 13 illustrates an example process for monitoring subscription interactions as described herein.

FIG. 13 illustrates an example process 1300 for monitoring subscription interactions as described herein.

Block 1302 illustrates monitoring subscription interactions of customer(s) and/or merchant(s). In at least one example, after a subscription has been created for a customer or a merchant, the subscription module 112 can monitor interactions between the subscription and the customer or the merchant. In some examples, customer(s) and/or merchant(s) can modify and/or cancel their subscription(s) via GUIs, such as those described above with reference to FIGS. 5 and 6. In at least one example, a customer may request to decrease the frequency at which the customer receives an installment, or a merchant may reduce a number of subscriptions available. Such interactions can be monitored by the subscription module 112.

Block 1304 illustrates determining whether a customer or a merchant is likely to cancel a subscription. In at least one example, the subscription module 112 can analyze subscription interactions and can predict when a customer or a merchant is likely to cancel a subscription. In such an example, the subscription module 112 can utilize machine-trained data models, statistical models, heuristics, or other mechanisms for determining that a customer or a merchant is likely to cancel a subscription. For instance, subscription interactions can be monitored and the subscription module 112 can output a score indicative of a likelihood that a customer or a merchant is going to cancel a subscription. If the score meets or exceeds a threshold, the subscription module 112 can determine that the customer or the merchant is likely to cancel the subscription.

Block 1306 illustrates sending an offer to the customer or the merchant, wherein the offer is associated with an incentive. Based at least in part on determining that the customer or the merchant is likely to cancel a subscription, the subscription module 112 can send an offer to the customer or the merchant. In at least one example, the offer can be associated with an incentive. For example, the incentive for the customer can be a discount associated with the subscription. Or, the incentive for the merchant can be access to a service for a discounted rate. In any event, the incentive can seek to discourage the customer or the merchant from cancelling the subscription. In at least one example, the offer can be sent via email, text message, push notification, or the like. Furthermore, in some examples, such an offer can be presented via a GUI, such as the GUIs described above with reference to FIGS. 5 and 6.

If the subscription module 112 determines that a customer or a merchant is not likely to cancel a subscription, the subscription module 112 can continue to monitor subscription interactions, as illustrated in block 1302.

In some examples, if a customer or a merchant cancels a subscription, the subscription module 112 can send an offer to re-subscribe to a subscription at a time after the customer or the merchant cancels the subscription. In at least one example, the offer can be associated with an incentive (e.g., discount, etc.). In some examples, the subscription module 112 can wait to send such an offer until a prescribed period of time has lapsed, until transaction data identifies another subscription opportunity, etc.

Figure 14:
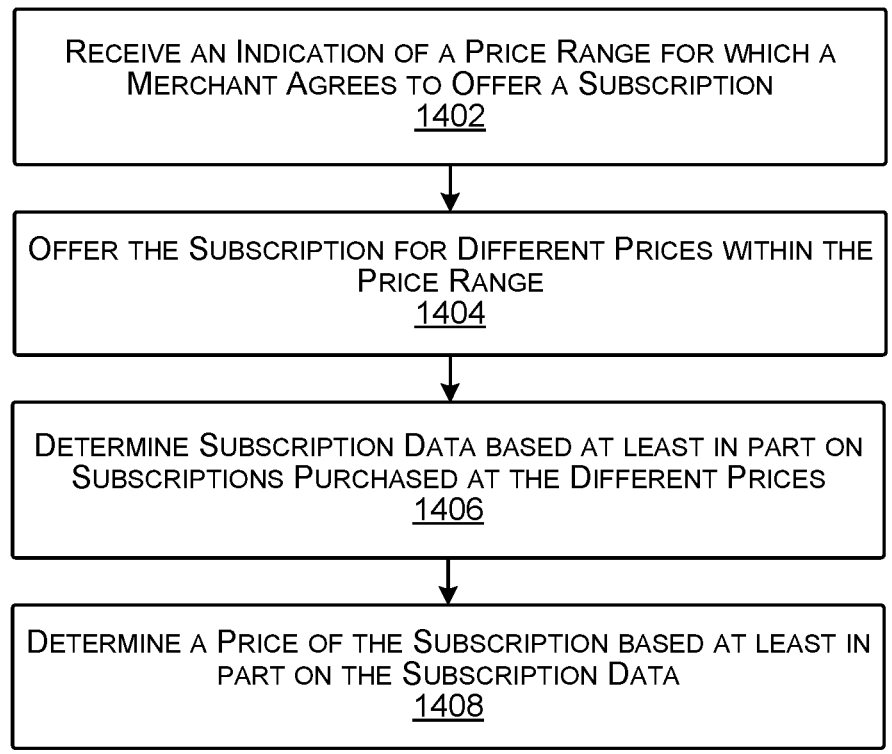
FIG. 14 illustrates an example process for determining pricing for a subscription as described herein.

FIG. 14 illustrates an example process 1400 for determining pricing for a subscription as described herein.

Block 1402 illustrates receiving an indication of a price range for which a merchant agrees to offer a subscription. In some examples, a merchant can provide a price range for which the merchant agrees to offer a subscription and/or items associated with the subscription.

Block 1404 illustrates offering the subscription for different prices within the price range. In at least one example, the subscription module 112 can offer a subscription for an item to one or more customers, wherein individual of the customers are offered the subscription for different prices within the price range. That is, in at least one example, the subscription module 112 can utilize AB testing to optimize pricing or discounts for the subscription and/or items associated therewith.

Block 1406 illustrates determining subscription data based at least in part on subscriptions purchased at the different prices. In at least one example, the subscription module 112 can monitor subscriptions purchased, for example, over a period of time. The subscription module 112 can generate subscription data which can indicate conversion rates, sales rates, cancellation rates, etc. associated with subscriptions offered at the different prices, over a period of time.

Block 1408 illustrates determining a price of the subscription based at least in part on the subscription data. In at least one example, the subscription module 112 can determine a price for the subscription based at least in part on the subscription data. For example, if one of the prices is associated with a conversion rate that is higher than the other prices within the range, the subscription module 112 can recommend the merchant offer the subscription at the price associated with the highest conversion rate. Additionally or alternatively, if one of the prices is associated with a sales rate that is higher than the other prices within the range, the subscription module 112 can recommend the merchant offer the subscription at the price associated with the highest sales rate. Moreover, if one of the prices is associated with a cancellation rate that is lower than the other prices within the range, the subscription module 112 can recommend the merchant offer the subscription at the price associated with the lowest cancellation rate.

In at least one example, the subscription module 112 can continuously optimize pricing and/or discounts based on techniques described with respect to process 1400.

Furthermore, in at least one example, the subscription module 112 can additionally or alternatively perform similar testing to determine a price for a subscription that is likely to generate particular margins for the merchant. For instance, a merchant can provide a target margin associated with a subscription and the subscription module 112 can offer the subscription at different prices (e.g., via AB testing) to determine how such pricing affect the target margin. That is, the subscription module can leverage the results to find the best price for the merchant (e.g., for achieving the target margin) and can continuously optimize the price offered to new customers.

Figure 15:
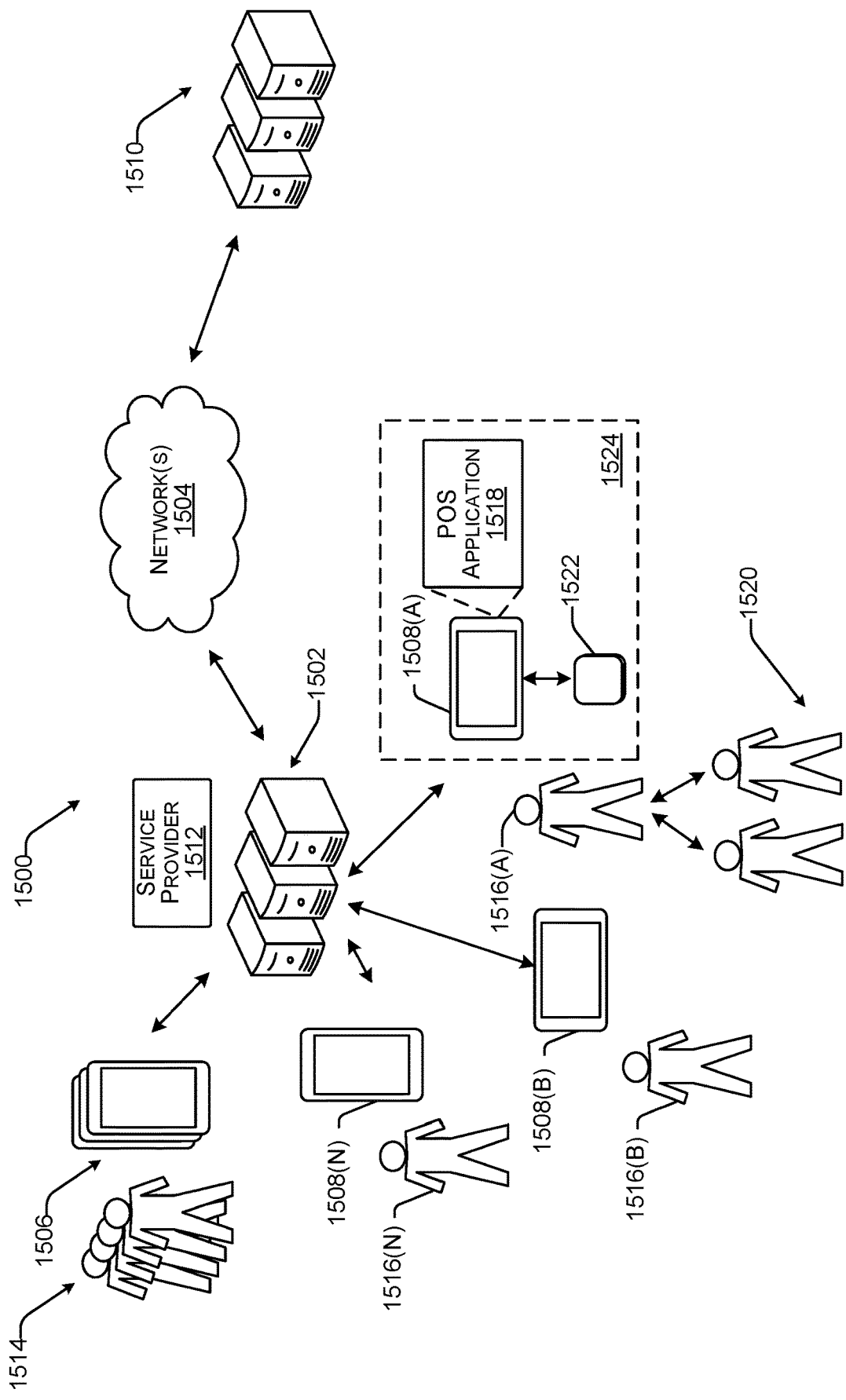
FIG. 15 illustrates an example merchant ecosystem for facilitating, among other things, techniques described herein.

FIG. 15 illustrates an example environment 1500. The environment 1500 includes server computing device(s) 1502 that can communicate over a network 1504 with user devices 1506 (which, in some examples can be merchant devices 1508 (individually, 1508(A)-1508(N))) and/or server computing device(s) 1510 associated with third-party service provider(s). The server computing device(s) 1502 can be associated with a service provider 1512 that can provide one or more services for the benefit of users 1514, as described below. Actions attributed to the service provider 1512 can be performed by the server computing device(s) 1502. Similarly, actions attributed to users can be performed by and/or via the user device(s) 1506, as described herein.

In at least one example, the server(s) 102 described above with reference to FIG. 1 corresponds to the server(s) 1502 described herein. Further, the user devices 1506 can correspond to the merchant device(s) 104 and/or customer device(s) 106 described above with reference to FIG. 1. In at least one example, the users 514 can correspond to the merchant(s) 108 and/or customer(s) 110 described above with reference to FIG. 1. The network(s) 1504 can correspond to the network(s) 107 described above with reference to FIG. 1. That is, the example environment 1500 can perform techniques for, among other things as described below, intelligently identifying opportunities for subscriptions for merchants and/or customers using transaction data associated with past transactions, as described above.

As described above, a subscription is an arrangement for providing, receiving, or making use of something of a continuing or periodic nature. Rather than selling items (e.g., goods or services) individually, many merchants offer customers subscriptions where customers pay a recurring price at regular intervals for access to a good or a service. However, in conventional technologies, merchants opt to offer only certain items via a subscription model, e.g., based on item availability or knowledge that items are consumable (and thus require replacement). Many conventional technologies require merchants to create a subscription plan. That is, conventional technologies are inefficient and cause friction for merchants. Many items that are ripe for subscriptions are overlooked and merchants don't take the time to create subscription plans because of the time and resources required.

Conventional technologies do not have access to transaction data as described herein. That is, conventional technologies do not utilize a network-based merchant environment, as illustrated in FIG. 15, to generate and/or access transaction data for multiple, different merchants (and customers) for determining buying patterns across multiple, different merchants (and customers). Such buying patterns can be used to intelligently identify subscription opportunities for merchants and/or customers, even for items that are otherwise not identified by a traditional subscription model. That is, the example environment 1500 illustrated in FIG. 15, can leverage transaction data—that can include item-level granularity—associated with multiple, different merchants (and/or customers) to generate customized and/or personalized subscription opportunities as opposed to the one-size-fits-all subscriptions that are availed via conventional technologies. For instance, techniques described herein can identify subscription opportunities that enable customers to receive items at a frequency particular to their buying habits (or other customers similar to the customers) and/or enable merchants to provide items at a frequency that is observed from buying habits of their customers and/or customers of other or similar merchants. In some implementations, creating customer-specific subscription flows can simplify network complexities and improve network efficiencies by replacing one-off/irregular purchase behavior with predictable purchase behavior.

Techniques described herein offer various benefits to entities associated with the network-based merchant environment, as illustrated in FIG. 15. For instance, by providing a recommendation to a merchant based on customer purchase behavior, the merchant is more likely to convert a customer into a repeat customer or even a subscriber. As such, the merchant can receive an incremental increase in revenue based on ensuring that a customer purchases an item repeatedly as opposed to running the risk of the customer forgetting to make their regular purchase. Furthermore, more subscriptions enable recurring revenue and increased cash flow for merchants. Moreover, techniques described herein enable merchants to dynamically offer subscriptions on the fly based on what their customers are purchasing, thereby reducing the friction of generating and/or managing subscriptions. For customers, techniques described herein reduce friction associated with regular purchases and, in some examples, enable customers to subscribe to items or services through subscriptions that are customized and/or personalized for them. Additional benefits and efficiencies are described throughout this disclosure.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider 1512 or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1508 can have an instance of a POS application 1518 stored thereon. The POS application 1518 can configure the merchant device 1508 as a POS terminal, which enables the merchant 1516(A) to interact with one or more customers 1520. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "POS transactions" and/or "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server computing device(s) 1502. Furthermore, the POS application 1518 can present a UI to enable the merchant 1516(A) to interact with the POS application 1518 and/or the service provider 1512 via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication-based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. Additional details are described below with reference to FIG. 16. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server computing device(s) 1502, which can provide, among other services, a payment processing service. The server computing device(s) 1502 associated with the service provider 1512 can communicate with server computing device(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server computing device(s) 1510 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1524, the server computing device(s) 1502, and/or the server computing device(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server computing device(s) 1502 over the network(s) 1504. Such information can be associated with the transaction data 120 described above with reference to FIG. 1. The server computing device(s) 1502 may send the transaction data to the server computing device(s) 1510. As described above, in at least one example, the server computing device(s) 1510 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1510 associated therewith) can send a fund transfer request to a server computing device of a card payment network (e.g., Mastercard®, VISA®, etc.) to determine whether the transaction is authorized or deficient. In at least one example, the service provider 1512 can serve as an acquirer and connect directly with the card payment network.

The card payment network (e.g., the server computing device(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1510 associated therewith) can make a determination as to whether the customer has the capacity to absorb the relevant charge associated with the payment transaction. In at least one example, the service provider 1512 can serve as an issuer and/or can partner with an issuer. The transaction is either approved or rejected by the issuer and/or the card payment network (e.g., the server computing device(s) 1510 associated therewith), and a payment authorization message is communicated from the issuer to the POS device via a path opposite of that described above, or via an alternate path.

As described above, the server computing device(s) 1510, which can be associated with payment service provider(s), may determine whether the transaction is authorized based on the transaction data, as well as information relating to parties to the transaction (e.g., the customer 1520 and/or the merchant 1516(A)). In at least one example, such a transaction can be associated with a subscription and/or an installment of a subscription (e.g., an order associated therewith). The server computing device(s) 1510 may send an authorization notification over the network(s) 1504 to the server computing device(s) 1502, which may send the authorization notification to the POS system 1524 over the network(s) 1504 to indicate whether the transaction is authorized. The server computing device(s) 1502 may also transmit additional information such as transaction identifiers to the POS system 1524. In one example, the server computing device(s) 1502 may include a merchant application and/or other functional components for communicating with the POS system 1524 and/or the server computing device(s) 1510 to authorize or decline transactions.

Based on the authentication notification that is received by the POS system 1524 from server computing device(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1512 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1514 can access all of the services of the service provider 1512. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider 1512 can offer payment processing services for processing payments on behalf of the merchants 1516, as described above. For example, the service provider 1512 can provision payment processing software, payment processing hardware and/or payment processing services to merchants 1516, as described above, to enable the merchants 1516 to receive payments from the customers 1520 when conducting POS transactions with the customers 1520. For instance, the service provider 1512 can enable the merchants 1516 to receive cash payments, payment card payments, and/or electronic payments from customers 1520 for POS transactions and the service provider 1512 can process transactions on behalf of the merchants 1516.

As the service provider 1512 processes transactions on behalf of the merchants 1516, the service provider 1512 can maintain accounts or balances for the merchants 1516 in one or more ledgers. For example, the service provider 1512 can analyze transaction data received for a transaction to determine an amount of funds owed to a merchant 1516(A) for the transaction. In at least one example, such an amount can be a total purchase price less fees charged by the service provider 1512 for providing the payment processing services. Based on determining the amount of funds owed to the merchant 1516(A), the service provider 1512 can deposit funds into an account of the merchant 1516(A). The account can have a stored balance, which can be managed by the service provider 1512. The account can be different from a conventional bank account at least because the stored balance is managed by a ledger of the service provider 1512 and the associated funds are accessible via various withdrawal channels including, but not limited to, scheduled deposit, same-day deposit, instant deposit, and a linked payment instrument.

A scheduled deposit can occur when the service provider 1512 transfers funds associated with a stored balance of the merchant 1516(A) to a bank account of the merchant 1516(A) that is held at a bank or other financial institution (e.g., associated with the server computing device(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider 1512 deposits funds from the stored balance to a linked bank account of the merchant on a same day as POS transaction, in some examples prior to the POS transaction being funded) or instant deposits (e.g., wherein the service provider 1512 deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider 1512 to the bank account of the merchant 1516(A).

In at least one example, the service provider 1512 may provide inventory management services. That is, the service provider 1512 may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider 1512 can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1561(A) has available for acquisition. The service provider 1512 can offer recommendations related to pricing of the items, placement of items on the catalog, and multi-party fulfilment of the inventory.

In at least one example, the service provider 1512 can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider 1512 can provide financing services and products, such as via business loans, consumer loans, fixed term loans, flexible term loans, and the like. In at least one example, the service provider 1512 can utilize one or more risk signals to determine whether to extend financing offers and/or terms associated with such financing offers.

In at least one example, the service provider 1512 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1512 can offer different types of capital loan products. For instance, in at least one example, the service provider 1512 can offer a daily repayment loan product, wherein a capital loan is repaid daily, for instance, from a portion of transactions processed by the payment processing service on behalf of the borrower. Additionally and/or alternatively, the service provider 1512 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1512 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider 1512 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1512 (e.g., from payments owed to the merchant from payments processed on behalf of the merchant, funds transferred to the merchant, etc.). The service provider 1512 can offer specific financial products, such as payment instruments, tied specifically to the loan products. For example, in one implementation, the server provider 1512 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1512 can provide web-development services, which enable users 1514 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1516. In at least one example, the service provider 1512 can recommend and/or generate content items to supplement omni-channel presences of the merchants 1516. That is, if a merchant of the merchants 1516 has a web page, the service provider 1512—via the web-development or other services—can recommend and/or generate additional content items to be presented via other channel(s), such as social media, email, etc.

Furthermore, the service provider 1512 can provide payroll services to enable employers to pay employees for work performed on behalf of employers. In at least one example, the service provider 1512 can receive data that includes time worked by an employee (e.g., through imported timecards and/or POS interactions), sales made by the employee, gratuities received by the employee, and so forth. Based on such data, the service provider 1512 can make payroll payments to employee(s) on behalf of an employer via the payroll service. For instance, the service provider 1512 can facilitate the transfer of a total amount to be paid out for the payroll of an employee from the bank of the employer to the bank of the service provider 1512 to be used to make payroll payments. In at least one example, when the funds have been received at the bank of the service provider 1512, the service provider 1512 can pay the employee, such as by check or direct deposit, often a day, a week, or more after when the work was actually performed by the employee. In additional or alternative examples, the service provider 1512 can enable employee(s) to receive payments via same-day or instant deposit based at least in part on risk and/or reliability analyses performed by the service provider 1512.

Moreover, in at least one example, the service provider 1512 can provide employee management services for managing schedules of employees. Further, the service provider 1512 can provide appointment services for enabling users 1514 to set schedules for scheduling appointments and/or users 1514 to schedule appointments.

In some examples, the service provider 1512 can provide restaurant management services to enable users 1514 to make and/or manage reservations, to monitor front-of-house and/or back-of-house operations, and so on. In such examples, the merchant device(s) 1508 and/or server computing device(s) 1502 can be configured to communicate with one or more other computing devices, which can be located in the front-of-house (e.g., POS device(s)) and/or back-of-house (e.g., kitchen display system(s) (KDS)). In at least one example, the service provider 1512 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1512 can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the service provider 1512. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1512 can receive requests for courier services, automatically assign the requests to active couriers, and communicate dispatch instructions to couriers via user interface (e.g., application, web browser, or other access point) presented via respective devices 1506.

In some examples, the service provider 1512 can provide omni-channel fulfillment services. For instance, if a customer places an order with a merchant and the merchant cannot fulfill the order because one or more items are out of stock or otherwise unavailable, the service provider 1512 can leverage other merchants and/or sales channels that are part of the platform of the service provider 1512 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1512 can enable conversational commerce via conversational commerce services, which can use one or more machine learning mechanisms to analyze messages exchanged between two or more users 1514, voice inputs into a virtual assistant or the like, to determine intents of user(s) 1514. In some examples, the service provider 1512 can utilize determined intents to automate customer service, offer promotions, provide recommendations, or otherwise interact with customers in real-time. In at least one example, the service provider 1512 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1512 can provide a peer-to-peer payment service that enables peer-to-peer payments between two or more users 1514. In at least one example, the service provider 1512 can communicate with instances of a payment application (or other access point) installed on devices 1506 configured for operation by users 1514. In an example, an instance of the payment application executing on a first device operated by a payor can send a request to the service provider 1512 to transfer an amount of funds (e.g., fiat currency or non-fiat currency such as cryptocurrency, securities, and related assets) from an account of the payor to an account of a payee (e.g., a peer-to-peer payment). The service provider 1512 can facilitate the transfer and can send a notification to an instance of the payment application executing on a second mobile device operated by the payee that the transfer is in process (or has been completed). In some examples, the service provider 1512 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1512 funds the request to payee on behalf of the payor, to speed up the transfer process and compensate for any lags that may be attributed to payor's financial network.

In some implementations, the service provider 1512 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1506.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages.

The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1512. For instance, the service provider 1512 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server computing device(s) 1502 (which, in such an example can be called a "messaging server"). In some instances, the messaging application can include a payment application with messaging capability that enables users of the payment application to communicate with one another. In such instances, the payment application can be executed on a user device 1506 based on instructions transmitted to and from the server computing device(s) 1502 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1512 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1514 may be new to the service provider 1512 such that the user 1514 that has not registered (e.g., subscribed to receive access to one or more services offered by the service provider) with the service provider 1512. The service provider 1512 can offer onboarding services for registering a potential user 1514 with the service provider 1512. In some examples, onboarding can involve presenting various questions, prompts, and the like to a potential user 1514 to obtain information that can be used to generate a profile for the potential user 1514. In at least one example, the service provider 1512 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1514 providing all necessary information, the potential user 1514 can be onboarded to the service provider 1512. In such an example, any limited or short-term access to services of the service provider 1512 can be transitioned to more permissive (e.g., less limited) or longer-term access to such services.

The service provider 1512 can be associated with IDV services, which can be used by the service provider 1512 for compliance purposes and/or can be offered as a service, for instance to third-party service providers (e.g., associated with the server computing device(s) 1510). That is, the service provider 1512 can offer IDV services to verify the identity of users 1514 seeking to use or using their services. Identity verification requires a customer (or potential customer) to provide information that is used by compliance departments to prove that the information is associated with an identity of a real person or entity. In at least one example, the service provider 1512 can perform services for determining whether identifying information provided by a user 1514 accurately identifies the customer (or potential customer) (i.e., Is the customer who they say they are?).

The service provider 1512 is capable of providing additional or alternative services and the services described above are offered as a sampling of services. In at least one example, the service provider 1512 can exchange data with the server computing device(s) 1510 associated with third-party service providers. Such third-party service providers can provide information that enables the service provider 1512 to provide services, such as those described above. In additional or alternative examples, such third-party service providers can access services of the service provider 1512. That is, in some examples, the third-party service providers can be subscribers, or otherwise access, services of the service provider 1512.

Techniques described herein can be configured to operate in both real-time/online and offline modes. "Online" modes refer to modes when devices are capable of communicating with the service provider 1512 (e.g., the server computing device(s) 1502) and/or the server computing device(s) 1510 via the network(s) 1504. In some examples, the merchant device(s) 1508 are not capable of connecting with the service provider 1512 (e.g., the server computing device(s) 1502) and/or the server computing device(s) 1510, due to a network connectivity issue, for example. In additional or alternative examples, the server computing device(s) 1502 are not capable of communicating with the server computing device(s) 1510 due to network connectivity issue, for example. In such examples, devices may operate in "offline" mode where at least some payment data is stored (e.g., on the merchant device(s) 1508) and/or the server computing device(s) 1502 until connectivity is restored and the payment data can be transmitted to the server computing device(s) 1502 and/or the server computing device(s) 1510 for processing.

In at least one example, the service provider 1512 can be associated with a hub, such as an order hub, an inventory hub, a fulfillment hub and so on, which can enable integration with one or more additional service providers (e.g., associated with the additional server computing device(s) 1510). In some examples, such additional service providers can offer additional or alternative services and the service provider 1512 can provide an interface or other computer-readable instructions to integrate functionality of the service provider 1512 into the one or more additional service providers.

Techniques described herein are directed to services provided via a distributed system of user devices 1506 that are in communication with one or more server computing devices 1502 of the service provider 1512. That is, techniques described herein are directed to a specific implementation—or, a practical application—of utilizing a distributed system of user devices 1506 that are in communication with one or more server computing devices 1502 of the service provider 1512 to perform a variety of services, as described above. The unconventional configuration of the distributed system described herein enables the server computing device(s) 1502 that are remotely-located from end-users (e.g., users 1514) to intelligently offer services based on aggregated data associated with the end-users, such as the users 1514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1512, and those outside of the control of the service provider 1512, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
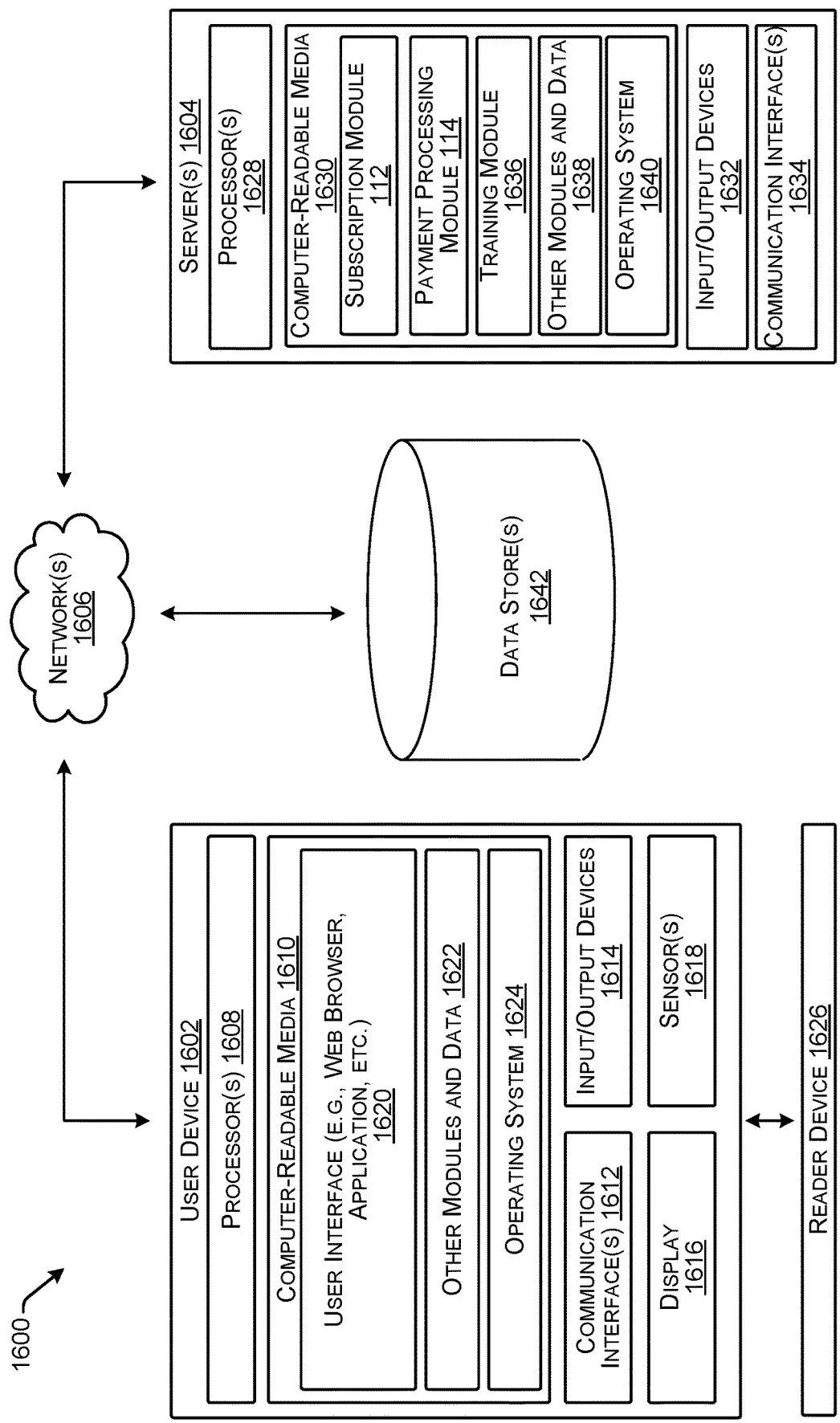
FIG. 16 illustrates additional details associated with individual components of the merchant ecosystem described above in FIG. 15.

FIG. 16 depicts an illustrative block diagram illustrating a system 1600 for performing techniques described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 15.

In at least one example, the server(s) 102 described above with reference to FIG. 1 corresponds to the server(s) 1604 described herein. Further, the user device 1602 can correspond to any one of the merchant device(s) 104 or customer device(s) 106 described above with reference to FIG. 1. The network(s) 1606 can correspond to the network(s) 107 described above with reference to FIG. 1. That is, the example environment 1600 can perform techniques for, among other things, intelligently identifying opportunities for subscriptions for merchants and/or customers using transaction data associated with past transactions, as described above.

As described above, a subscription is an arrangement for providing, receiving, or making use of something of a continuing or periodic nature. Rather than selling items (e.g., goods or services) individually, many merchants offer customers subscriptions where customers pay a recurring price at regular intervals for access to a good or a service. However, in conventional technologies, merchants opt to offer only certain items via a subscription model, e.g., based on item availability or knowledge that items are consumable (and thus require replacement). Many conventional technologies require merchants to create a subscription plan. That is, conventional technologies are inefficient and cause friction for merchants. Many items that are ripe for subscriptions are overlooked and merchants don't take the time to create subscription plans because of the time and resources required.

Conventional technologies do not have access to transaction data as described herein. That is, conventional technologies do not utilize a network-based merchant environment, as illustrated in FIG. 16, to generate and/or access transaction data for multiple, different merchants (and customers) for determining buying patterns across multiple, different merchants (and customers). Such buying patterns can be used to intelligently identify subscription opportunities for merchants and/or customers, even for items that are otherwise not identified by a traditional subscription model. That is, the system 1600 illustrated in FIG. 16, can leverage transaction data—that can include item-level granularity—associated with multiple, different merchants (and/or customers) to generate customized and/or personalized subscription opportunities as opposed to the one-size-fits-all subscriptions that are availed via conventional technologies. For instance, techniques described herein can identify subscription opportunities that enable customers to receive items at a frequency particular to their buying habits (or other customers similar to the customers) and/or enable merchants to provide items at a frequency that is observed from buying habits of their customers and/or customers of other or similar merchants. In some implementations, creating customer-specific subscription flows can simplify network complexities and improve network efficiencies by replacing one-off/irregular purchase behavior with predictable purchase behavior.

Techniques described herein offer various benefits availed via the system 1600, as illustrated in FIG. 16. For instance, by providing a recommendation to a merchant based on customer purchase behavior, the merchant is more likely to convert a customer into a repeat customer or even a subscriber. As such, the merchant can receive an incremental increase in revenue based on ensuring that a customer purchases an item repeatedly as opposed to running the risk of the customer forgetting to make their regular purchase. Furthermore, more subscriptions enable recurring revenue and increased cash flow for merchants. Moreover, techniques described herein enable merchants to dynamically offer subscriptions on the fly based on what their customers are purchasing, thereby reducing the friction of generating and/or managing subscriptions. For customers, techniques described herein reduce friction associated with regular purchases and, in some examples, enable customers to subscribe to items or services through subscriptions that are customized and/or personalized for them. Additional benefits and efficiencies are described throughout this disclosure.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, modules or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider 1512 associated with the server(s) 1604, or which can be an otherwise dedicated application. In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other modules and data 1622, which can include programs, drivers, etc., and the data used or generated by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1512, described above, to provide one or more services. That is, in some examples, the service provider 1512 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1514 and/or for sending users 1514 notifications regarding available appointments with merchant(s) located proximate to the users 1514. In at least one example, location can be used for taking payments from nearby customers when they leave a geofence, or location can be used to initiate an action responsive to users 1514 enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process them as payment instruments, given that such biometric characteristics are registered with the payment service system 100 and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more modules and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one module for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 166, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program modules, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider 1512 and/or payment processing service. Functional components stored in the computer-readable media 1630 can optionally include a subscription module 112, a payment processing module 114, as described above with reference to FIG. 1, a training module 1636, and one or more other modules and data 1638.

In at least one example, in addition to the functionality described above with reference to the payment processing module 114, the payment processing module 114 can be configured to receive transaction data from POS systems, such as the POS system 1524 described above with reference to FIG. 15. The payment processing module 114 can transmit requests (e.g., authorization, capture, settlement, etc.) to payment service server computing device(s) to facilitate POS transactions between merchants and customers. The payment processing module 114 can communicate the successes or failures of the POS transactions to the POS systems. The merchant module The training module 1636 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1602 and/or the server(s) 1604 for use at a time after the data models have been trained (e.g., at runtime).

The one or more other modules and data 1638 can include programs, drivers, etc., and the data used or generated by the functional components. Further, the server(s) 1604 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more APIs to perform some or all of its functionality (e.g., operations). In at least one example, a SDK can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1630 can additionally include an operating system 1640 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1602 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a data store 1642 that can be configured to store data that is accessible, manageable, and updatable. In some examples, the data store 1642 can be integrated with the user device 1602 and/or the server(s) 1604. In other examples, as shown in FIG. 16, the data store 1642 can be located remotely from the server(s) 1604 and can be accessible to the server(s) 1604. The data store 1642 can comprise multiple databases and/or servers connected locally and/or remotely via the network(s) 1606.

In at least one example, the data store 1642 can store data as described above with reference to FIG. 1 (e.g., profile(s) 116, inventory data 118, transaction data 120). Furthermore, in at least one example, the data store 1642 can store catalog database(s). A catalog can store data associated with items that a merchant has available for acquisition. The data store 1642 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1-6, 15, and 16 for convenience and ease of understanding. However, the methods illustrated are not limited to being performed using components described in FIGS. 1-6, 15, and 16, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method, implemented at least in part by a computing system of a payment processing service, the method comprising:
   receiving, by the computing system, first transaction data associated with (i) brick-and-mortar transactions between merchants associated with the payment processing service and first customers and (ii) ecommerce transactions between the merchants and the first customers;
   based at least in part on the first transaction data, processing, by the computing system, payments for the brick-and-mortar transactions and the ecommerce transactions, wherein processing a payment of the payments includes:
      generating an authorization request for the payment based on corresponding first transaction data; and
      transmitting the authorization request to a device of a third-party payment service provider;
   receiving, by the computing system and from a device operable by a merchant of the merchants, second transaction data associated with a second transaction between the merchant and a second customer;
   determining, by the computing system and based at least in part on the first transaction data and the second transaction data, that one or more of the first customers and the second customer have purchased instances of an item at a substantially regular interval;
   determining, by the computing system, a recommendation to offer a subscription to enable the one or more of the first customers and the second customer to periodically access additional instances of the item;
   sending, from the computing system and in near real-time, the recommendation to the device operable by the merchant of the merchants;
   responsive to receiving an indication that the merchant desires to offer the subscription, associating, by the computing system, the subscription with a profile of the merchant maintained by the computing system, wherein the indication is stored in the profile of the merchant; and
   processing, by the computing system, another payment for the second transaction.

2. The method as claim 1 recites, further comprising causing, via a user interface presenting at least a portion of inventory of the merchant, an actuation mechanism to be presented in association with the item, wherein the actuation mechanism enables a customer of the first customers or the second customer to activate the subscription.

3. The method as claim 2 recites, further comprising, responsive to receiving an indication of an actuation of the actuation mechanism by the customer, associating the subscription with a profile of the customer.

4. A system comprising:
   one or more processors; and
   one or more computer-readable media that, when executed by the one or more processors, cause the system to perform operations comprising:
      receiving first transaction data associated with transactions between a plurality of merchants and one or more customers;
      based at least in part on receiving the first transaction data, processing payments for the transactions, wherein processing a payment of the payments includes:
         generating an authorization request for the payment based on corresponding transaction data; and
         transmitting the authorization request to a device of a third-party payment service provider;
      receiving, from a device operable by a merchant of the plurality of merchants, second transaction data associated with a second transaction between the merchant and a first customer of the one or more customers;

determining, based at least in part on one or more of a portion of the first transaction data associated with the first customer and the second transaction data, that the first customer purchased a first item at a first time;

determining, based at least in part on the first transaction data, that a second customer of the one or more customers purchased a second item at a second time;

determining, based at least in part on the first item and the second item, a recommendation to offer a subscription to enable the one or more customers to access a third item at a third time;

sending, in near real-time, the recommendation to the device operable by the merchant;

associating an indication of the subscription with a profile of the merchant maintained by a payment processing service, wherein the indication is stored in the profile of the merchant; and processing another payment for the second transaction.

5. The system as claim 4 recites, wherein the transactions comprise at least one of:
one or more brick-and-mortar transactions; or
one or more ecommerce transactions.

6. The system as claim 4 recites, the operations further comprising presenting a graphical user interface via the device operable by the merchant, wherein the graphical user interface enables the merchant to manage the subscription and one or more other subscriptions associated with the merchant.

7. The system as claim 6 recites, the operations further comprising:
accessing, from the profile of the merchant associated with the payment processing service, payment data associated with an account maintained by the payment processing service; and
depositing payment revenue generated based at least in part on processing payment for fulfillment of the subscription into the account.

8. The system as claim 4 recites, wherein the first item and the second item are instances of an item, and the operations further comprise:
determining, based at least in part on the first time and the second time, that the one or more customers purchase instances of the item at a substantially regular interval; and
determining the recommendation to offer the subscription based at least in part on determining that the one or more customers purchase instances of the item at the substantially regular interval.

9. The system as claim 4 recites, the operations further comprising:
receiving an indication of a price range for which the merchant agrees to offer the subscription;
offering the subscription for different prices within the price range;
determining subscription data based at least in part on one or more subscriptions purchased at the different prices; and
determining a price of the subscription based at least in part on the subscription data.

10. The system as claim 4 recites, the operations further comprising:
determining, based at least in part on at least one of the first transaction data and the second transaction data, a discount to offer a subscriber of the subscription; and
sending the recommendation with an indication of the discount.

11. The system as claim 4 recites, wherein the first item and the second item are instances of an item, and the operations further comprise:
determining, based at least in part on at least one of the first transaction data and the second transaction data, a frequency at which a subscriber of the subscription is to receive an instance of the item associated with the subscription; and
sending the recommendation with an indication of the frequency.

12. The system as claim 4 recites, the operations further comprising sending the recommendation with an incentive for the merchant to offer the third item via the subscription.

13. The system as claim 4 recites, the operations further comprising causing a graphical user interface to be presented via a display of the device operable by the merchant, wherein the graphical user interface includes an indication of the subscription to enable the merchant to manage the subscription.

14. The system as claim 4 recites, wherein the first item, the second item, and the third item are instances of an item, and the operations further comprise:
generating, prior to a fulfillment event associated with an installment of the subscription, an order associated with the fulfillment event, the order associated with the third item;
reserving the third item in an inventory of the merchant based at least in part on the order;
processing payment for the order;
determining, based at least in part on processing payment for the order, that a cost of the order is satisfied; and
processing the order based at least in part on the cost of the order being satisfied.

15. A method, implemented at least in part by a computing system of a payment processing service, the method comprising:
receiving, by the computing system, first transaction data associated with one or more transactions between one or more merchants and one or more customers;
based at least in part on the first transaction data, processing, by the computing system, payments for the one or more transactions, wherein processing a payment of the payments includes:
generating an authorization request for the payment based on corresponding first transaction data; and
transmitting the authorization request to a device of a third-party payment service provider;
receiving, by the computing system from a device operable by a merchant of the one or more merchants, second transaction data associated with a second transaction between the merchant and a first customer of the one or more customers;
determining, by the computing system and based at least in part on one or more of a portion of the first transaction data associated with the first customer or the second transaction data, that the first customer purchased a first item at a first time;
determining, by the computing system and based at least in part on the first transaction data, that a second customer of the one or more customers purchased a second item at a second time;

determining, by the computing system, a recommendation to offer a subscription to enable the one or more customers to access a third item at a third time;

sending, by the computing system and in near real-time, the recommendation to the device operable by the merchant of the one or more merchants;

associating, by the computing system, an indication of the subscription with a profile of the merchant maintained by the computing system, wherein the indication is stored in the profile of the merchant; and processing, by the computing system, another payment for the second transaction.

16. The method as claim 15 recites, wherein the indication of the subscription is associated with the profile of the merchant without input from the merchant and the method further comprises:

receiving an indication that the merchant does not desire to offer the subscription; and terminating the association between the indication of the subscription and the profile of the merchant.

17. The method as claim 15 recites, wherein associating the indication of the subscription with the profile of the merchant comprises:

receiving an indication that the merchant desires to offer the subscription; and associating the indication of the subscription with the profile of the merchant responsive to receiving the indication that the merchant desires to offer the subscription.

18. The method as claim 15 recites, determining at least one related item to bundle with the subscription, wherein the recommendation is additionally associated with another subscription for at least one related item.

19. The method as claim 18 recites, wherein the at least one related item is associated with a different merchant.

20. The method as claim 15 recites, further comprising:

receiving, at a time after the subscription is associated with the profile of the merchant, a request to terminate offering the subscription; and causing an offer for the subscription to be presented to the merchant, wherein the offer is associated with an incentive to encourage the merchant to continue offering the subscription.

* * * * *